United States Patent
Paluch et al.

(10) Patent No.: US 12,105,537 B2
(45) Date of Patent: Oct. 1, 2024

(54) ADJUSTABLE MULTISTAGE PRESSURE REDUCING REGULATOR WITH AUGMENTED THERMAL CONTROL

(71) Applicant: Mustang Sampling, LLC, Ravenswood, WV (US)

(72) Inventors: William C. Paluch, Jersey Village, TX (US); Kenneth O. Thompson, Ravenswood, WV (US); Kevin Warner, The Woodlands, TX (US)

(73) Assignee: Mustang Sampling, LLC, Ravenswood, WV (US)

( * ) Notice: Subject to any disclaimer, the term of this patent is extended or adjusted under 35 U.S.C. 154(b) by 0 days.

(21) Appl. No.: 18/623,326

(22) Filed: Apr. 1, 2024

(65) Prior Publication Data

US 2024/0241528 A1     Jul. 18, 2024

Related U.S. Application Data

(60) Continuation-in-part of application No. 17/992,164, filed on Nov. 22, 2022, now Pat. No. 11,971,733, (Continued)

(51) Int. Cl.
    *G05D 16/10*     (2006.01)
    *G05D 16/04*     (2006.01)

(52) U.S. Cl.
    CPC .......... *G05D 16/103* (2013.01); *G05D 16/107* (2019.01); *G05D 16/0402* (2019.01); *G05D 16/109* (2019.01); *Y10T 137/7795* (2015.04)

(58) Field of Classification Search
    CPC .......... Y10T 137/7795; Y10T 137/7826; Y10T 137/7869; G05D 16/0402; G05D 16/103; G05D 16/107; G05D 16/109
    See application file for complete search history.

(56) References Cited

U.S. PATENT DOCUMENTS 1,957,972 A     5/1934    Mills
2,057,133 A     10/1936    Bryce et al.
(Continued)

FOREIGN PATENT DOCUMENTS

CN     201980868 U     9/2011
CN     203274863 U     11/2013
(Continued)

OTHER PUBLICATIONS

Italian Patent Office, Search Report for Application No. IT201900018617, Jun. 17, 2020.
(Continued)

*Primary Examiner* — Robert K Arundale
(74) *Attorney, Agent, or Firm* — Cahn & Samuels, LLP

(57) ABSTRACT

A multi-stage pressure regulation system, device with enhanced thermal distribution for reducing the pressure of gas passing through a gas sample conditioning system. The device and method allow for automatic and/or manual configuration settings for regulating different types of gas having different profiles while still avoiding dew point dropout thereby ensuring accurate sample analysis at a downstream analyzer. The pressure regulating device includes a housing having a core, a vapor sample input port, a plurality of openings on an upper surface, a plurality of pressure regulating valves configured to reduce the pressure of a vapor sample, an assembly having a base and substantially central stem orthogonal to the base and extending axially therefrom, the stem being disposed within the core, and an adjunct for enhanced distribution of thermal energy from the heating device to the plurality of pressure regulating valves.

14 Claims, 13 Drawing Sheets

Related U.S. Application Data which is a division of application No. 17/467,842, filed on Sep. 7, 2021, now Pat. No. 11,573,582, which is a continuation of application No. 17/025,476, filed on Sep. 18, 2020, now Pat. No. 11,144,078.

(60) Provisional application No. 62/904,022, filed on Sep. 23, 2019.

(56) References Cited

U.S. PATENT DOCUMENTS

| | | | |
|---|---|---|---|
| 2,057,150 | A | 10/1936 | Kehl et al. |
| 2,160,849 | A | 6/1939 | Fausek et al. |
| 2,306,060 | A | 12/1942 | Jacobsson |
| 2,642,701 | A | 6/1953 | Goodner |
| 2,672,891 | A | 3/1954 | Fausek et al. |
| 2,816,561 | A | 12/1957 | Krueger |
| 3,369,559 | A | 2/1968 | Murphy |
| 4,674,531 | A | 6/1987 | Aalto et al. |
| 4,860,787 | A | 8/1989 | Grosselin |
| 5,285,810 | A | 2/1994 | Gotthelf |
| 5,595,209 | A | 1/1997 | Atkinson et al. |
| 5,755,254 | A | 5/1998 | Carter et al. |
| 5,841,036 | A | 11/1998 | Mayeaux |
| 6,116,269 | A | 9/2000 | Maxson |
| 6,527,009 | B2 | 3/2003 | Zheng et al. |
| 6,648,021 | B2 | 11/2003 | Zheng et al. |
| 6,722,388 | B1 | 4/2004 | McAden |
| 7,080,655 | B2 | 7/2006 | Jacksier et al. |
| 7,162,933 | B2 | 1/2007 | Thompson et al. |
| 7,341,074 | B2 | 3/2008 | Pechtold |
| 7,484,404 | B2 | 2/2009 | Thompson et al. |
| 7,752,919 | B2 | 7/2010 | Straub, Jr. et al. |
| 7,992,423 | B2 | 8/2011 | Bailey et al. |
| 8,220,479 | B1 | 7/2012 | Mayeaux |
| 8,448,662 | B1 | 5/2013 | Beswick et al. |
| 8,544,343 | B2 | 10/2013 | Gottlieb et al. |
| 8,739,597 | B2 | 6/2014 | Day |
| 9,057,668 | B2 | 6/2015 | Thompson et al. |
| 9,562,833 | B2 | 2/2017 | Thompson et al. |
| 9,574,917 | B2 | 2/2017 | Hidaka et al. |
| 9,588,024 | B1 | 3/2017 | St. Amant, III et al. |
| 10,078,035 | B2 | 9/2018 | Curtis |
| 10,126,214 | B1 | 11/2018 | St. Amant, III |
| 10,281,368 | B2 | 5/2019 | Thompson et al. |
| RE47,478 | E | 7/2019 | Thompson |
| 10,394,254 | B2 | 8/2019 | Kirchner et al. |
| 10,613,006 | B1 | 4/2020 | Thompson et al. |
| 10,641,687 | B1 | 5/2020 | St. Amant, III |
| 10,684,259 | B2 | 6/2020 | Warner et al. |
| 2002/0124883 | A1 | 9/2002 | Zheng et al. |
| 2006/0005887 | A1 | 1/2006 | Bonta, Jr. |
| 2007/0215220 | A1 | 9/2007 | Bannon |
| 2009/0071548 | A1 | 3/2009 | Patterson et al. |
| 2010/0180960 | A1 | 7/2010 | Patterson et al. |
| 2014/0102560 | A1 | 4/2014 | Yoshioka et al. |
| 2015/0337769 | A1 | 11/2015 | Yoshioka et al. |
| 2016/0281873 | A1 | 9/2016 | Yoshioka |
| 2017/0114924 | A1 | 4/2017 | Tatarek |
| 2017/0115673 | A1 | 4/2017 | Kobayashi et al. |
| 2017/0123439 | A1 | 5/2017 | Koening et al. |
| 2017/0212534 | A1 | 7/2017 | Graham et al. |
| 2017/0344030 | A1 | 11/2017 | Kirchner et al. |

FOREIGN PATENT DOCUMENTS

| | | |
|---|---|---|
| CN | 201902830 U | 7/2014 |
| JP | 58217019 | 12/1983 |
| JP | 2005325686 | 11/2005 |
| KR | 10-2012-0109477 | 10/2012 |

OTHER PUBLICATIONS

U.S. International Searching Authority, International Written Opinion for Application No. PCT/US20/5178, Dec. 17, 2020.

U.S. International Searching Authority, Search Report for Application No. PCT/US20/51728, Dec. 17, 2020.

Espacenet, English Abstract for CN201980868U, accessed Jan. 4, 2021.

Google Patents English Abstract for CN203274863U, accessed Sep. 9, 2015.

European Patent Office, Supplemental Partial Search Report for EP20867424.2, Jan. 11, 2024.

Google Patents English Abstract for CN203274863 U, printed on Sep. 9, 2015.

Italian Patent Office Search Report (English excerpt) for Application No. IT201900018617, Jun. 17, 2020.

Espacenet English Abstract for CN201980868 U, printed on Sep. 21, 2020.

Machine translation of Oct. 4, 2023 Korean Office Action Appl. No. 10-2022-7011211.

Espacenet, European Patent Office, English abstract for JP58217019.

European Patent Office, Extended Search Report for EP20867424.2, Apr. 9, 2024.

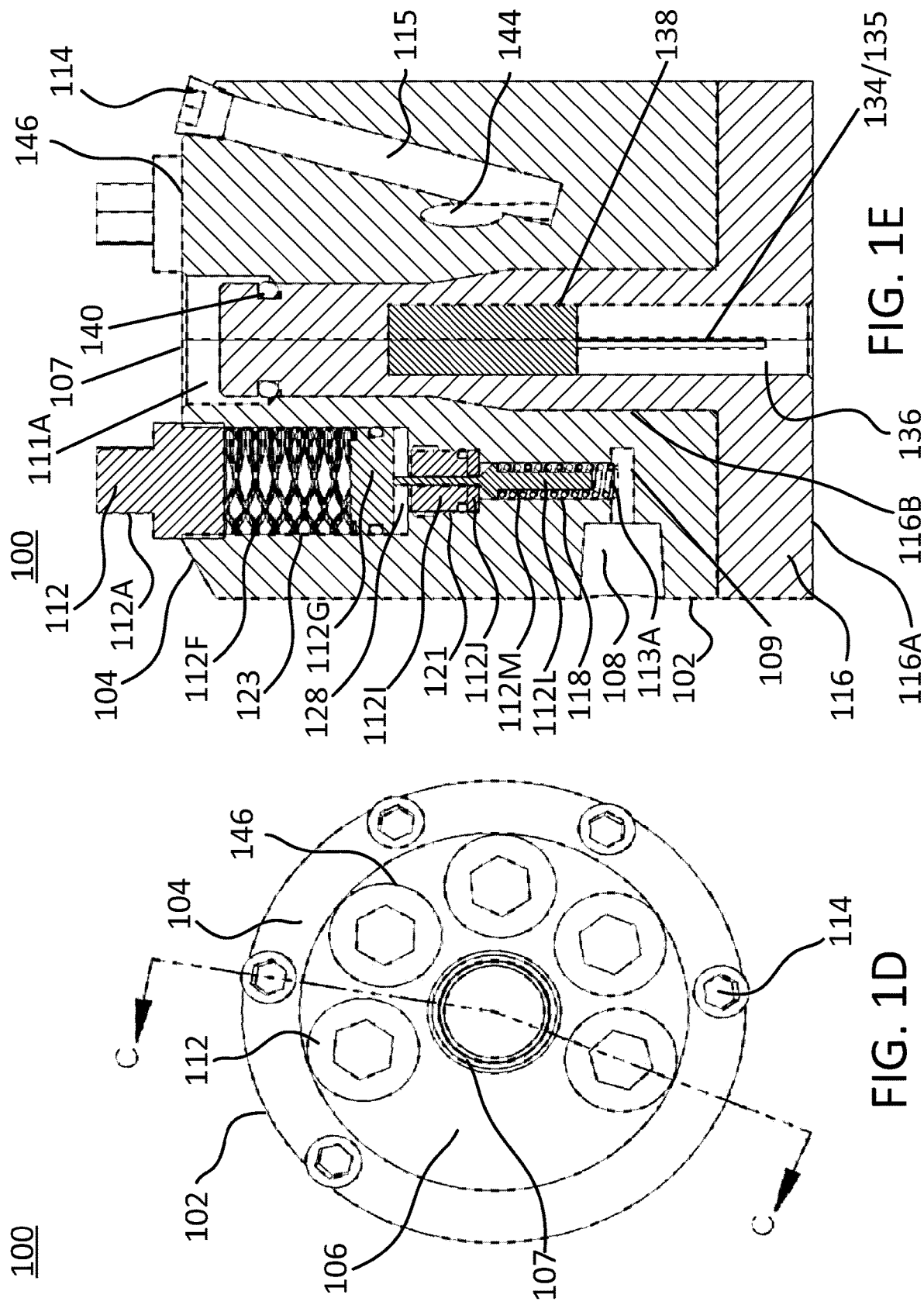

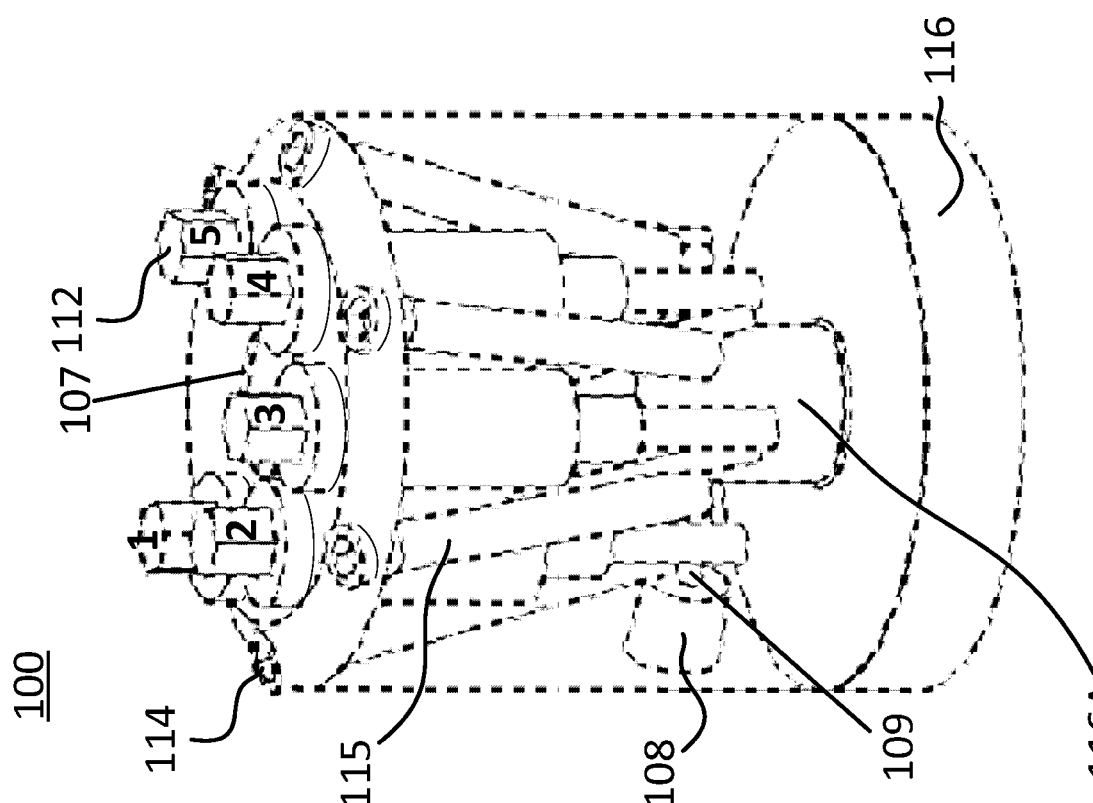
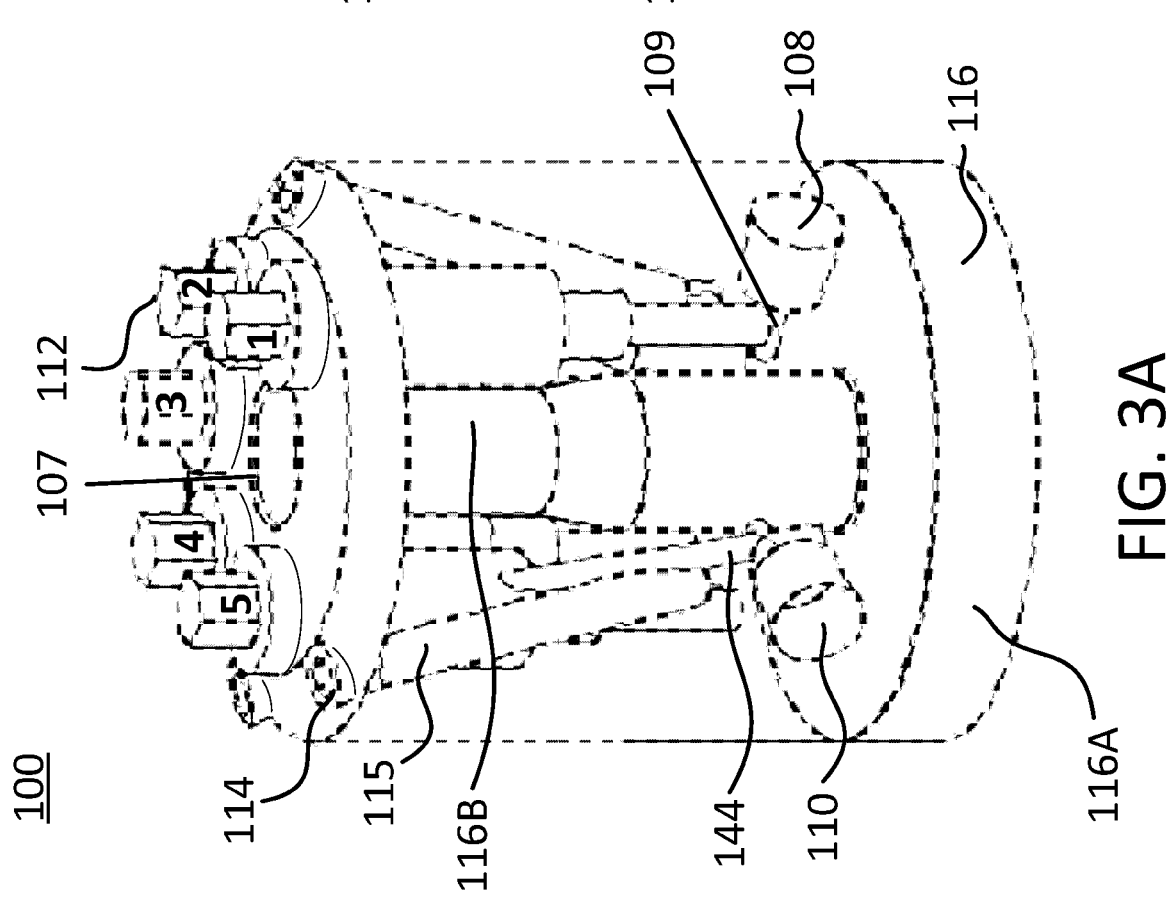
FIG. 3A
FIG. 3B

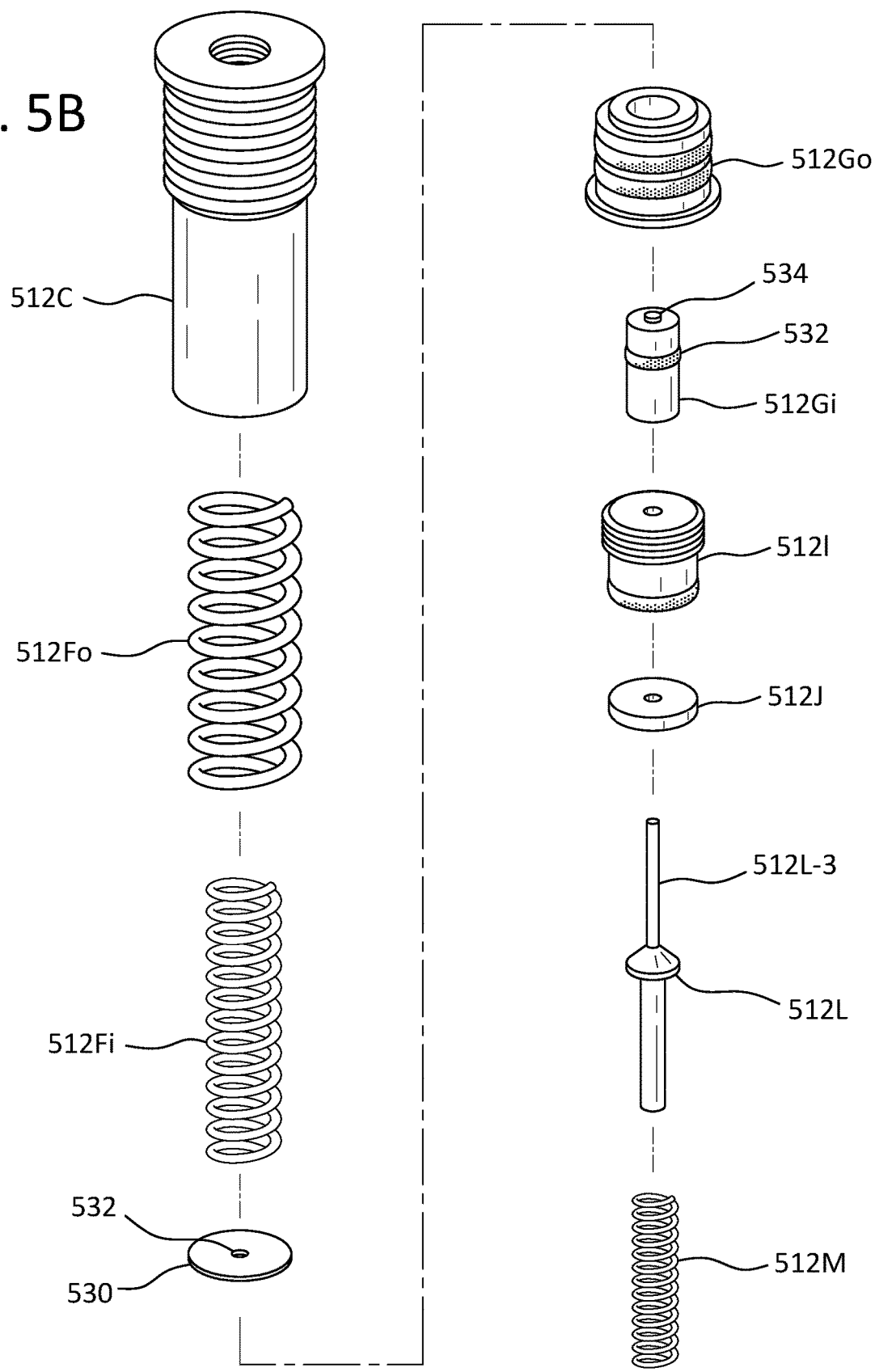

ADJUSTABLE MULTISTAGE PRESSURE REDUCING REGULATOR WITH AUGMENTED THERMAL CONTROL

FIELD OF THE INVENTION

This invention relates to a vapor pressure reduction method and adjustable/calibratable multistage pressure reducing regulating device with enhanced heat energy distribution. The invention allows for intelligent automatic or manual adjustability adapted for customization according to particular thermodynamic requirements of the stepped depressurization of a condensable vapor gas as dictated by phase curves associated with the particular properties of the vapor gas. The invention when employed in a vaporized natural gas sample conditioning application provides a compact system and method for controlled staged pressure reduction of a vapor gas sample that avoids Joule-Thomson/dew point dropout condensation while maintaining the compositional integrity of the vapor throughout the depressurization process with an adjunct to enhance thermal control to provide a vapor sample at a low enough pressures to be non-damaging to a downstream analyzer.

BACKGROUND OF THE INVENTION

Although described herein in the context of natural gas, for which the invention is very useful, the invention is not intended to be limited exclusively to application in the natural gas sampling field. Due to its characteristics as a combustible, gaseous mixture of multiple hydrocarbon compounds the precise composition of which can vary widely particularly when produced by fracking, Natural Gas Liquids (NGL) possesses a broad array of characteristics. For example, a particular liquid can be composed of ethane, propane, butane, isobutane, pentanes, etc. and, therefore, can be useful for various applications such as, heating, fuel, and upon separation/fractionation, petrochemical feedstock, plastics manufacturing, etc. The last decade has seen significant advancements in technologies such as horizontal drilling and hydraulic fracturing techniques which have led to a steady increase in NGL production.

In contrast to NGL, high methane content Liquid Natural Gas (LNG) is produced by taking natural gas from a production field, removing impurities, and liquefying the natural gas for transfer. LNG is safer and easier to transport in the gas/vapor phase as it takes up approximately $\frac{1}{600}^{th}$ the volume of natural gas in the vapor state. Natural gas is mainly converted to LNG for long distance domestic transport or transport overseas by ship where laying pipelines is not economically or technically feasible.

When employed as an energy source, the energy content of natural gas, LNG and NGLs are typically measured and reported in BTUs. In the process of custody transfer and end use of NGL and LNG products, it is important that the BTU measurement of any particular extracted gas sample be accurate. Accordingly, in the context of custody transfer, accurate sampling and analysis of samples along various points in the distribution network, from the source, through a pipeline network to the end user, has economic importance. Particularly when the liquid natural gas supply results from input originating with different sources and locations, accountability of the varying energy content at any given point in the pipeline has financial consequences. Therefore, particularly in custody transfer operations, from an energy auditing perspective the respective energy content values of a liquid feedstock at each stage must be accurately and precisely sampled.

Further, some samples, such as an extracted natural gas sample, may be contaminated with small amounts of impurities that require detection and removal. Sour gas can comprise trace contaminants such as, mercury (Hg), hydrogen sulfide ($H_2S$), carbonyl sulfide (COS), mercaptans (R-SH), and aromatic compounds including those from the group known as BTEX (Benzene, Toluene, Ethylbenzene and Xylene). Accordingly, the amount of these trace contaminants must be accurately and precisely sampled to determine the quality of the sample.

Gas sample conditioning systems provide the capability for such accurate and precise sampling. One preferred system for sampling natural gas includes the Mustang® P53@ Sample Conditioning System available from Mustang Sampling, LLC of Ravenswood, West Virginia and described in U.S. Pat. No. 7,162,933, the entirety of which is herein incorporated by reference. When sampling LNG and more significantly, NGL, an important part of the gas sample conditioning process relates to vaporization of a liquid sample extracted via a probe from a gas pipeline or source and maintaining the compositional integrity of that vaporized sample from takeoff to analysis. To that end, the Applicant of the present invention has introduced several systems and techniques directed to generating and maintaining accurate and precise NGL and LNG extracted sample conditioning and control, such as those described and disclosed in U.S. Pat. RE47,478, U.S. Pat. No. 9,285,299, U.S. Ser. No. 10/281,368, U.S. Pat. Nos. 7,484,404, and 9,057,668, the entirety of each which is herein incorporated by reference, and sold as Mustang® Vaporizer Sampling Systems. Specifically, to vaporize the extracted liquid sample, the Mustang Vaporizer Sampling System® and Mustang® NGL Sample Conditioning System can include a vaporizer device which vaporizes an incoming sample as it cascades around an internal heating core. An exemplary vaporizer device for such purposes is described in Applicant's U.S. Pat. No. 10,613,006 (WO2020068325A1), the entirety of which is herein incorporated by reference.

Once an incoming liquid sample is vaporized into a gaseous state, the gas vapor is passed through small diameter tubing composed of a corrosion-resistant super alloy or equivalent to an analyzer, such as a chromatograph. A person of ordinary skill readily appreciates that a gas chromatograph analyzes a gas/vapor sample, identifies and quantifies the constituent gas/vapor components, and provides a data output representative of the extracted sample's energy content.

To accurately analyze a gas sample derived from a liquid source without damaging an analyzer/chromatograph, a gas sample exiting a vaporizer typically at a high pressure must be depressurized (by up to two magnitudes) to an analyzer safe level before introduction. By way of example, a vaporized NGL sample may exit the vaporizer at a high pressure, greater than 6996.11 kPa which must then be reduced to an analyzer safe pressure, typically between 135.83 kPa-328.88 kPa to avoid damaging and/or rendering the analyzer inoperative. However, at any specific pressure, if the temperature of a gas sample, whether a heterogeneous mixture of components possessing a range of vapor condensation lines or a substantially homogeneous composition with a more predictable phase envelope curve, decreases so as to intersect a particular liquid-vapor phase curve, dew point condensation/hydrocarbon dew point dropout results. In such an event and as a result of the gas/vapor thermodynamic properties, the vapor gas sample reverts into liquid form. This undesirable phase transition not only diminishes accuracy of energy content evaluation but also compromises the downstream analyzer/chromatograph, due to liquid input generated from the gas sample transiting through the condensation/phase transition boundary. By way of example, in the natural gas field, failure to adequately maintain pressure and temperature parameters of a vaporized sample will cause Joule-Thomson hydrocarbon dew point dropout. Introduction of such liquid invariably damages the chromatographic packing by column bleed which, in turn, results in generation of false readings from ghost peaks, etc. Such fouling may require taking the poisoned unit off-line either for complete replacement or for restoration to an operationally acceptable condition which In the case of a large scale transfer operation, causes major disruptions to normal processing.

Accordingly, to obtain accurate and precise natural gas constituent analysis, to avoid fouling analyzers with liquid input, and to maintain proper system operation, it is important to maintain a vaporized liquid sample at temperatures and pressures which are safe for analysis and which minimize phase transition and the risk of vapor condensation.

In an effort to address such issues, equipment has been developed to provide staged/stepped pressure reduction that maintains select temperatures to minimize the risk of approaching the vapor's phase transition boundary. For example, staged de-pressurizing regulator systems achieve multistage-pressurization reduction while maintaining sufficient temperatures to prevent vapor phase transition migration. Such systems are typically located in-line between the output of a liquid sample vaporizer and vapor feed line to a downstream analyzer/chromatograph. But as prior art regulators are not dynamically adjustable, they require specified minimum output pressures to meet or exceed the threshold input vapor gating pressure of the immediate downstream system. Furthermore, an array of dedicated in-line regulators are typically manufactured and calibrated for a specific application and, once manufactured, are not easily converted or adaptable for uses outside the specific parameters of the application.

Other pressure regulating designs seek to reduce the footprint of an array of discrete individual systems by stacking the pressure reducing regulator elements in a modular, multistage structure. While achieving a smaller footprint, such regulator systems or arrays suffer from shared functional deficiencies of multi-unit systems such as the inability of dynamic adjustment and calibration of the pressure parameters for individual modules. In this type of prior at system, the range of parameters for each unit/module is pre-set and features factory pre-calibration of input pressure and output pressure where the output pressure level must exceed the required minimum input pressure for introduction into the downstream module to assure operation of the entire regulating system. In operation, the exit pressure from the immediate upstream module may fall below the minimum threshold pressure required to gate the vapor to the adjacent downstream stage. Thus, the array fails to deliver the requisite vapor sample to the downstream analyzer or collection vessel.

By way of example, in the case of a four-stage modular regulator, the minimum supply pressure input to the first stage in the series must be sufficiently high so that following the third stage, the degree of depressurization still exceeds the minimum threshold for introduction into the fourth stage. If that threshold is not met, the prior art systems will cease to pass the vapor to the downstream elements.

The opposite problem may arise with prior art system operations. In a case of over-pressurized sample sources, the vapor pressure of the eventual output may exceed the permissible pressure threshold of a downstream analyzer. In such a case there is no protection against delivery of damaging over-pressurized gas to the chromatograph. In other words, the pre-set pressure, of for example, the fourth stage input is too high for the required pressure reduction of the output for safe operation of the analyzer.

There exists, therefore, a need for improvement to the presently accepted and commonly used devices and methods of sampling and controlling pressure regulation of extracted vapor samples.

SUMMARY OF THE INVENTION

It is an object of the invention to provide a device, system and method that do not suffer from at least the problems described previously herein and which can provide a more efficient, dynamic and reliable heated pressure regulating device with enhanced thermal control for regulating the pressure of a vapor gas sample which can then be passed to a gas analyzer or other pressure-sensitive equipment.

Another object of an aspect of the invention is to provide a compact adjustably calibratable heated multi-stage pressure regulating device, system and method that represent an improvement over the prior art.

Yet a further object of an aspect of the invention is to provide a heated staged system for significant pressure reduction of a vapor gas sample avoiding dew point dropout/condensation.

Still a further object of the invention is to provide an integrated, heated multistage depressurizing regulator that maintains the pressure and temperature of a vapor gas sample well outside the two-phase envelope boundary.

It is a further object of the invention to provide a device, system and method that can be used to deliver more accurate measurement of BTU values used for custody transfer. Further, to monitor and reduce undesired presence of sour gas samples, the device, system and method can also be used to deliver accurate measurement of trace contaminants such as, mercury (Hg), hydrogen sulfide ($H_2S$), carbonyl sulfide (COS), mercaptans (RSH) and aromatics such as BTEX (Benzene, Toluene, Ethylbenzene and Xylene).

It is yet another object of the invention to provide a device that is more compact, less susceptible to mechanical failure, and provides for dynamic pressure calibration adjustment.

Another object of the invention is to provide an automatic and/or manually configurable compact device that maintains the integrity of the vapor composition from a vaporizer to an analyzer by avoiding intermittent condensation during multistage depressurizing of multi-component vapor gas.

Still another object of an embodiment of this invention is to provide a compact, generally unitary, heated multi-stage pressure regulation device with adjustable calibration of pressure inputs and outputs at individual stages.

Still another object of an embodiment of this invention is to provide a thermal energy distributing adjunct for enhanced temperature control at the pressure regulator stages.

Illustrative, non-limiting embodiments of the present invention may overcome the aforementioned and other disadvantages associated with related art liquid gas vaporization and measurement systems. Also, the present invention is not necessarily required to overcome the disadvantages described above and an illustrative non-limiting embodiments of the present invention may not overcome any of the problems described above.

To achieve the above and other objects an embodiment in accordance with the invention includes a pressure regulating system, for stepped depressurization of a vapor sample, comprising: a) a housing, said housing including an elongated upper section and a lower section, said lower section including a base with a stem generally disposed orthogonal to and extending axially from the base and defining an exterior surface, the stem being formed so as to generally conform to the dimensions of the core and extending axially from a central portion of the base; b) a core of select length disposed generally longitudinally along a central axis of the upper section of the housing and defining an interior surface with an upper segment and a lower segment; c) a vapor sample input port connected to a vapor sample passage integrally formed within the upper section of the housing; d) a plurality of unvented openings on an upper surface of the upper section of the housing, each unvented opening being peripherally disposed about the core and adjacent to at least one other of said unvented openings, each of the unvented openings having a select cross-sectional dimension and extending substantially in the direction of elongation of the upper section of the housing, and each of said unvented openings being connected by an interconnect channel integrally formed in said upper section of the housing and connected to an adjacent ventless opening; e) a plurality of pressure regulating valves each of said plurality of pressure regulating valves having a cross-sectional dimension corresponding to the select cross-sectional dimension of an unvented opening, each of said plurality of pressure regulating valves being switchable between a non-pressure regulating mode and a pressure regulating mode for passing a vapor sample to an adjacent downstream pressure regulating valve at a select regulated pressure via the connected interconnect channel where each of said plurality of pressure regulating valves establishes a pressure reducing stage and includes a valve stem, a sense piston, and sense piston actuator; a most downstream regulating valve connected in series to said plurality of pressure regulating valves; f) a reduced vapor sample output port connected to said most downstream pressure regulating valve; g) a heating device disposed within the stem configured to heat vapor sample passing through the plurality of pressure regulating valves; and h) means for enhanced distribution of thermal energy from the heating device to the plurality of pressure regulating valves.

The foregoing objects are also achieved by a pressure regulating system, for stepped depressurization of a vapor sample, comprising: a housing with an upper portion where the upper portion includes a cylindrical core disposed generally longitudinally along a central axis of the upper portion of the housing and a lower portion where the upper portion of the housing includes an annular recess of a select radius and select depth and the lower portion of the housing includes an assembly having a base and stem generally disposed orthogonal to the base and extending axially therefrom, the base underlying the annular recess of the upper housing portion and the stem being formed so as to generally conform to the dimensions of the core and extending axially from a central portion of the base where the stem includes a longitudinal receiving bore of select length with an upper end and a lower end and cross-sectional dimensions formed therein; a vapor sample input port connected to a vapor sample passage integrally formed within the housing; a plurality of unvented openings on an upper surface of the housing, each unvented opening being peripherally disposed about the core and adjacent to at least one other of said unvented openings, each of the unvented openings having a select cross-sectional dimension and extending substantially in the direction of elongation of the housing, and each of said unvented openings being connected by an interconnect channel integrally formed in said housing and connected to an adjacent ventless opening; a plurality of pressure regulating valves each of said plurality of pressure regulating valves having a cross-sectional dimension corresponding to the select cross-sectional dimension of an unvented opening, each of said plurality of pressure regulating valves being switchable between a non-pressure regulating mode and a pressure regulating mode for passing a vapor sample to an adjacent downstream pressure regulating valve at a select regulated pressure via the connected interconnect channel where each of said plurality of pressure regulating valves establishes a pressure reducing stage and includes a valve stem, a sense piston, and sense piston actuator; a most downstream regulating valve connected in series to said plurality of pressure regulating valves; a reduced vapor sample output port connected to said most downstream pressure regulating valve; a heating device disposed within the stem with an upper end and a lower end where the upper end includes a temperature sensor and where heating device is configured to heat vapor sample passing through the plurality of pressure regulating valves; and a sleeve fitting with a radially extending flanged base and a cylindrical bayonet sleeve having a bottom section and a top section axially extending within the cylindrical core dimensioned to seat between the interior surface of the core and the exterior surface of the stem.

BRIEF DESCRIPTION OF THE DRAWINGS

The aspects of the present invention will become more readily apparent by describing in detail illustrative, non-limiting embodiments thereof with reference to the accompanying drawings, in which:

FIG. 1D is a top view of the pressure regulating device in accordance with an embodiment of the present invention.

FIG. 1E is a cross-sectional view of the pressure regulating device of FIG. 1D in accordance with an embodiment of the invention.

FIG. 3A is perspective view of the interior of the pressure regulating device in accordance with an embodiment of the invention.

FIG. 3B is perspective view of the interior of the pressure regulating device in accordance with the embodiment of the invention illustrated in FIG. 3A.

FIG. 5B is an exploded view of an embodiment of a high-pressure regulating valve assembly.

DEFINITIONS

Figure 1A:
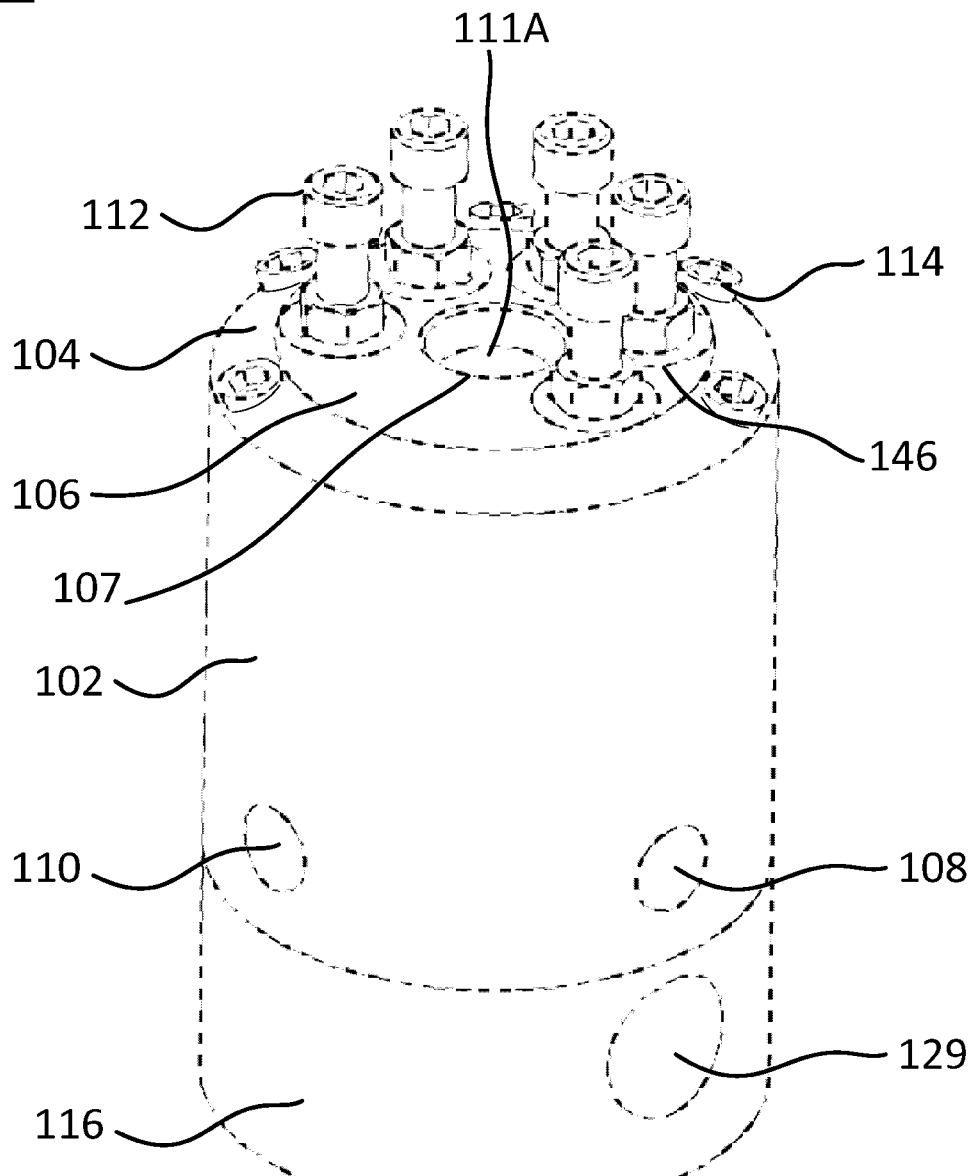
FIG. 1A is a perspective view illustrating a pressure regulating device in accordance with an embodiment of the present invention.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

It will be appreciated that as used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein "connected" includes physical, whether direct or indirect, permanently affixed or adjustably mounted. Thus, unless specified, "connected" is intended to embrace any operationally functional connection.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

As used herein "substantially", "relatively", "generally", "about", and "approximately" are relative modifiers intended to indicate permissible variation from the characteristic so modified. They are not intended to be limited to the absolute value or characteristic which it modifies but rather approaching or approximating such a physical or functional characteristic.

As used herein "tubular" means any axially-oriented generally elongated, generally symmetrical geometric configuration and is not limited to a structure possessing just a cylindrical cross-sectional profile.

As used herein, if not specified, "gas" means any type of gaseous chemical matter or fluid in gas form including, for example, a specific vaporized hydrocarbon component containing liquid matter, and/or a heterogenous mixture of hydrocarbon components, where gas may include natural gas liquids, and liquified natural gas, gas mixtures thereof, and equivalents.

Exemplary, non-limiting, embodiments of the present invention are discussed in detail below. While specific configurations and dimensions are discussed to provide a clear understanding, it should be understood that the disclosed dimensions and configurations are provided for illustration purposes only. A person skilled in the relevant art will recognize that, unless otherwise specified, other dimensions and configurations may be used without departing from the spirit and scope of the invention.

It will also be appreciated that as used herein, any reference to a range of values is intended to encompass every value within that range, including the endpoints of said ranges, unless expressly stated to the contrary.

DETAILED DESCRIPTION

In the following description, reference is made to the accompanying drawings which are provided for illustration purposes as representative of specific exemplary embodiments in which the invention may be practiced. The following illustrated embodiments are described in sufficient detail to enable those skilled in the art to practice the invention. It is to be understood that other embodiments may be utilized and that structural changes based on presently known structural and/or functional equivalents may be made without departing from the scope of the invention.

Given the following detailed description, it should become apparent to the person having ordinary skill in the art that the invention herein provides a novel pressure regulating device and a method thereof for providing significantly augmented efficiencies while mitigating problems recognized and unrecognized of the prior art structures and methods.

FIGS. 1A-1E illustrate various views of the different parts tubular upper body or housing 102, which in the illustrated embodiment possesses an elongated cylindrical geometry, a lower body or assembly 116 with a corresponding geometry, and adjustable pressure regulating valves 112 of a pressure regulating system which when assembled, provides for a pressure regulating device 100 in accordance with an embodiment of the invention. The invention is not limited to a cylindrical/circular cross-sectional geometry as other geometries such as polygonal, oval, etc. are equally employable.

In overview, the pressure regulating device 100 includes the assembly 116 which preferably is formed of a corrosion-resistant super alloy, such as stainless-steel or aluminum. In lieu of alloys, the upper body 102 and assembly 116 may also be fabricated/molded of high-strength engineered thermoplastics, ceramics, or other materials compatible for use in connection with vapor gas pressure regulation. The assembly 116 of the current embodiment includes a base 116A featuring a circular cross-section, an upper surface defining a shoulder, a stepped, and partially hollowed stem 116B projecting centrally and orthogonally from the shoulder. The stem 116B dimensionally conforms to and is adapted for insertion into a complementary stepped axial core or bore 111 in the body 102 which is relatively elongated to the height of the base and comprising larger diameter, lower segment 111C tapering to narrower bore middle segment 111B and expanding to upper bore segment 111A.

The stem 116B includes an inner cavity 136 for receiving and retaining an electrical heating cartridge element 138 powered by feed lines 134 and the output sensed by a thermocouple 135 both projecting from a base of the heating cartridge element 138 and exiting the assembly 116 via electrical and control output port 129.

In the illustrated embodiment, the upper body 102 features an opening 107 formed in the upper surface 106 at the top of the bore 111. A series of threaded plugs 114 are disposed about and near the perimetric annulus 104 of the upper surface 106. Each of the plugs 114 seals an access channel 115 that angles radially inwardly from perimetric annulus 104 toward the bore 111. The upper surface 106 also features five axially-offset, longitudinally projecting, valve receiving recessed openings 146. The recessed openings 146 are disposed around the opening 107 and extend longitudinally and generally parallel to the axis of elongation of the upper body 102. Each of the recessed openings 146 is stepped and dimensioned to seat and retain a pressure regulating valve 112 (see FIG. 4).

Figure 1B:
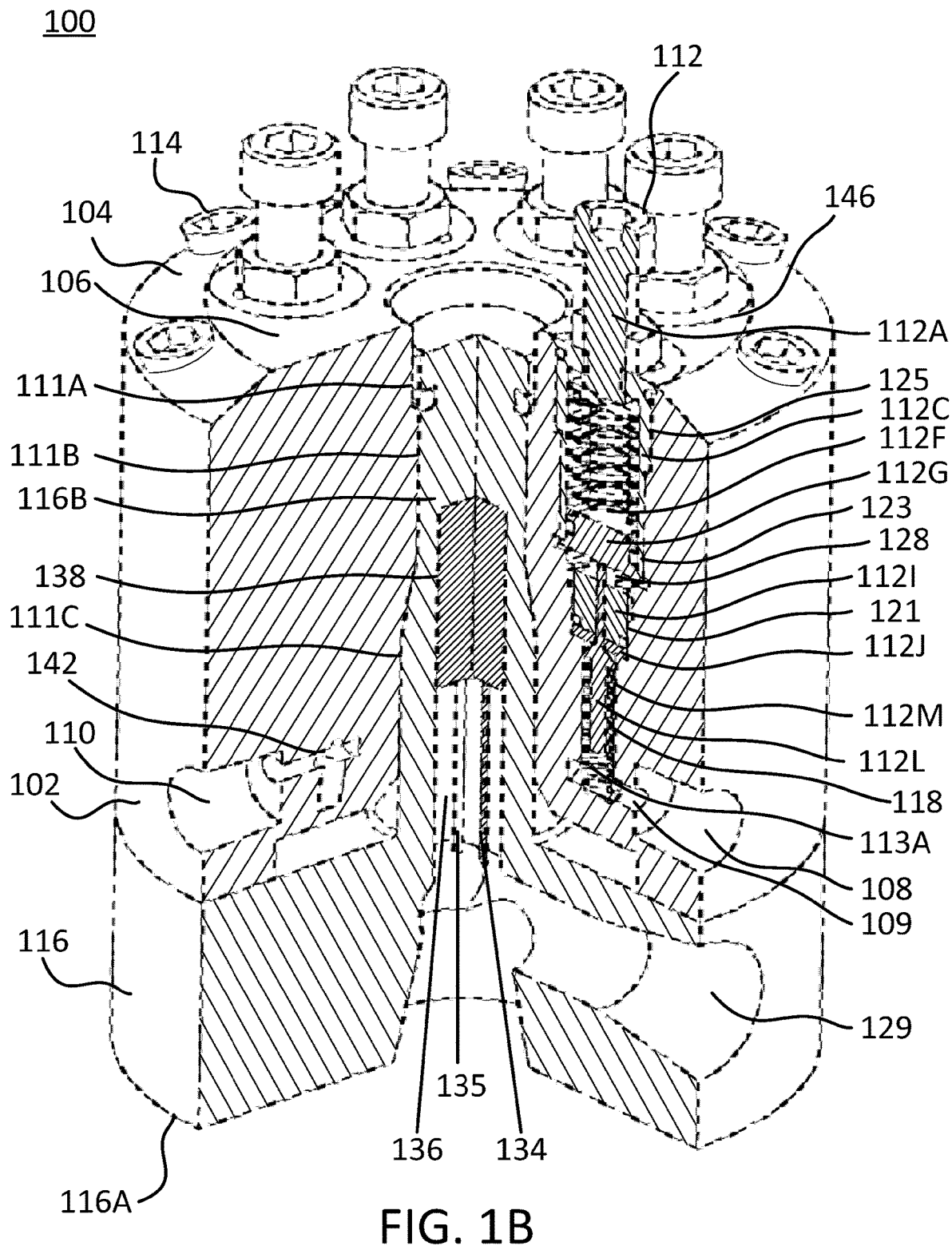
FIG. 1B is a perspective cut-away view of the pressure regulating device in accordance with an embodiment of the invention.

FIG. 1B illustrates a cut-away perspective view of the pressure regulating device 100 in which the assembly 116 is arranged within the segments 111A, B, C of the upper body 102 and pressure regulating valves 112 are seated in the respective openings 146. As illustrated in the cutaway FIG. 1B, a first pressure regulating valve 112 is configured to receive the vapor sample from the vapor sample inlet port 108 via the radially-oriented vapor sample passageway 109.

A vapor gas sample is directed to a first-stage pressure regulating valve 112 via a vapor sample passageway 109 at connector port 113A. As detailed below, the pressure regulating valve 112 reduces the pressure of the vapor gas sample which is then directed in serial fashion to an adjacent pressure regulating valve 112 for additional pressure reduction while being optimally simultaneously thermally controlled via the central heating cartridge element 138. Upon exiting a final-stage pressure regulating valve 112, the vapor gas sample, now being at an analyzer safe pressure, is directed from the tubular upper body 102 through vapor sample passageway 142 to vapor sample outlet port 110.

Referring to the structure and placement of the lower portion of the pressure regulating valve 112 it is seated in the valve receiving recessed opening 146 to permit controlled axial adjustment based on spring pressure. The recessed opening 146 includes in stepped configuration, a lower bore 118, a diametrically larger middle bore 121, and a larger upper bore 123, within opening 146 from upper planar surface 106. The pressure regulating valve 112 features in combination, an upwardly biased, axially disposed helical compression valve stem spring 112M, a valve stem 112L segmented into a cylindrical valve stem base 112L-1 terminating with an upper shoulder defining a flared, conical valve stem projection 112L-2, a valve stem tip 112L-3 that projects upwardly through a valve seat 112J and a valve guide 112I to sense piston 112G and a downwardly biased flat/Belleville/wave sense piston actuator spring 112F. The upper shoulder acts as a stop for the upwardly biased, axially disposed helical compression valve stem spring 112M that engirds the valve stem 112L below the conical valve stem projection 112L-2. An elongated segment of the valve stem tip 112L-3 projects axially and upwardly from the tapering surface of the conical valve stem projection 112L-2 to the bottom surface of the sense piston 112G.

Disposed within the middle bore 121 is a valve seat 112J and valve guide 112I sealed to each other with a sealing device 112K, such as an O-ring, and each having a substantially central channel 127 therein allowing for passage of the valve stem tip 112L-3 and vapor gas sample therethrough. The valve guide 112I can be connected to the tubular upper body 102 by being bolted or screwed into the tubular upper body 102 via guide hole 131. The valve seat 112J faces the lower bore 118 on one surface and the valve guide 112I on the other, both of which form an entirety of the middle bore 121. The valve seat 112J can be composed of a compliant material, such as a ceramic, an elastomer or silicone, which helps prevent contamination or sealing of the substantially central channel 127 by the conical valve stem projection 112L-2. The conical valve stem projection 112L-2 also protects against contamination due to its shape as it compresses into the valve seat 112J and acts as a wiper. Accordingly, the central channel 127 through the valve seat 112J has a larger diameter than the central channel 127 through the valve guide 112I to allow for the compression and secure wiping contact with the valve seat 112J by the conical valve stem projection 112L-2. The valve seat 112J and valve guide 112I are fixed in position within the middle bore 121 and do not move during the operation of the pressure regulating valve 112.

The upper bore 123 includes an axially disposed sense piston actuator 112F, such as for example a spring, engirded by a spring housing 112C and extending from an adjustment device 112A, such as a screw or bolt, protruding from opening 146 to a sense piston 112G disposed within a lower portion of the upper bore 123. A pressure regulating valve 112 can be in one of three positions at any given time: a fully open position, a regulating position and a fully closed position. A pressure regulating valve 112 will be in a fully open position when the pressure regulating device 100 is not in use and no pressure or very low pressure is present within the lower bore 118. Thus, this condition exists when a pressure exerted by the sense piston spring 112F far exceeds the pressure of any minimal incoming vapor gas sample traveling into the lower bore 118 such that there is very little to no axial movement imposed upon the valve stem 112L via a valve stem spring 112M. This provides a sizable gap between the conical valve stem projection 112L-2 and the valve seat 112J.

When the pressure regulating device 100 is in use and regulating an incoming vapor gas sample the pressure regulating valve(s) 112 will be in the regulating position. For this condition to exist, a pressure exerted by the sense piston spring 112F on sense piston 112G based on the setting of the sense piston spring 112F offsets the pressure of any incoming vapor gas sample traveling into the lower bore 118. Thus, when the pressure regulating valve(s) 112 are in the regulating position and the pressure exerted by the sense piston spring 112F exceeds the pressure of any incoming vapor sample traveling into the lower bore 118, the sense piston 112G will be approximate but not contacting the top surface of the valve guide 112I and exerting a linear downward pressure on the valve stem tip 112L-3 which displaces conical valve stem projection 112L-2 from the valve seat 112J. This linear displacement maintains the flow of any vapor sample from the lower bore 118 to the upper bore 123 via a channel 127. However, an incoming vapor gas sample having a pressure larger than the pressure exerted by the sense piston spring 112F will force the valve stem 112L to move axially upward thereby causing the valve stem tip 112L-3 to slightly displace the sense piston 112G from its position approximate the valve guide 112I while also displacing the conical valve stem projection 112L-2 axially upward into a portion of the channel 127 within valve seat 112J. Thus, when in operation and in the regulating position, the pressure regulating valve(s) 112 will continually adjust based on pressure settings at each stage and incoming vapor sample pressure until a steady state is attained in which pressure is reduced at each stage for consumption at a constant flow rate for a downstream analyzer.

Figure 1C:
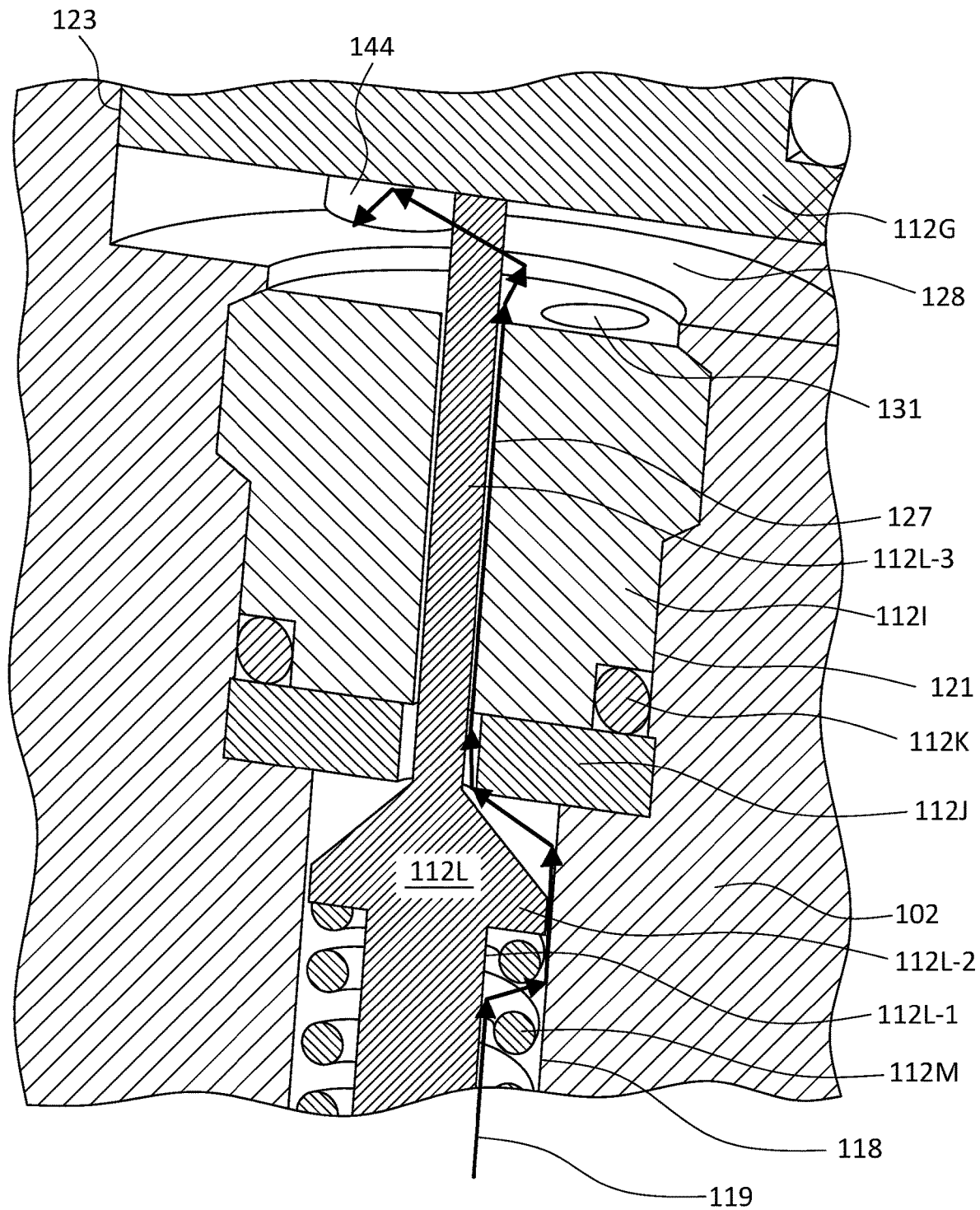
FIG. 1C is an expanded view of a pressure regulating valve of the pressure regulating device of FIG. 1B in accordance with an embodiment of the invention illustrating vapor flow through the valve.

FIG. 1C illustrates an expanded view of the pressure regulating valve 112 in the regulating position. As illustrated, a vapor gas sample 119 having a pressure greater than that of the pressure exerted upon the valve stem tip 112L-3 by sense piston 112G has entered the lower bore 118 thereby causing the valve stem 112L to move axially upward such that the valve stem tip 112L-3 slightly displaces the sense piston 112G axially upwards within the upper bore 123 and causes the conical valve stem projection 112L-2 to encroach the portion of the channel 127 within valve seat 112J. As illustrated, the central channel 127 formed between the valve seat 112J and the valve guide 112I has a slightly larger diameter than that of the valve stem tip 112L-3 which allows for the flow of the vapor sample 119 from the lower bore 118, through the middle bore 121 and into a gap 128 within the upper bore 123. Accordingly, any vapor sample 119 entering the upper bore 123 will have its pressure reduced based on the pressure differential between the lower bore 118 and the upper bore 123, the passage within the limited space of the central channel 127 and the limited passage size between the valve seat 112J and the conical valve stem projection 112L-2. The pressure-reduced vapor sample 119 will continue to pass through the bores 118, 121 and 123 while the pressure exerted by the vapor sample 119 on the sense piston 112G is the same as the valve setting of the sense piston spring 112F. If the pressure of the vapor sample 119 is no longer great enough to match the force exerted by the sense piston spring 112F, the pressure regulating valve 112 will move to a more open position where sense piston spring 112F will displace the sense piston 112G which in turn displaces the conical stem projection 112L-2 away from valve seat 112J via valve stem tip 112L-3. Conversely, if the pressure of the vapor sample flow 119 is too high, conical valve stem projection 112L-2 blocks the valve seat 112J thereby preventing vapor flow.

Accordingly, any vapor sample 119 that exits the lower bore 118 to gap 128 in the upper bore 123 while the pressure regulating valve 112 was in the regulating position will exit at a preselected pressure via interconnect channel 144 and be directed to a next-stage pressure regulating valve 112 in the body 102 for further pressure reduction. This construct and operation eliminate the need for over-pressure vapor gas venting from the interconnection channel 144 between the pressure regulating valves. Provision of an for over-pressurized vapor output to a downstream regulating valve assembly 112 is both unnecessary and undesirable because the outputted vapor pressure in the interconnection channel 144 has already been reduced to an adjusted level. Consequently, the unvented, less complicated structure of the disclosed embodiment is achieved. Also venting vapor before analysis compromises the integrity and precision of the ultimate sample analysis.

The pressure regulating valve 112 will be in a fully closed position when the output of the valve is blocked, the outlet pressure condition is satisfied and no volumetric consumption or condensation is present (i.e. the downstream analyzer is off and not continuously reducing pressure at the outlet 110.) In other words, pressure formed by the incoming vapor sample that gets blocked will translate backward and exert a large pressure on the sense piston 112G in addition to any pressure exerted on the sense piston spring 112G by the valve stem tip 112L-3. This increase in pressure on the sense piston 112G axially displaces the sense piston 112G upward within the upper bore 123 thereby allowing the valve stem 112L to correspondingly axially displace upward and be fully seated within the valve seat 112J thereby fully blocking the channel 127.

Figure 2A:
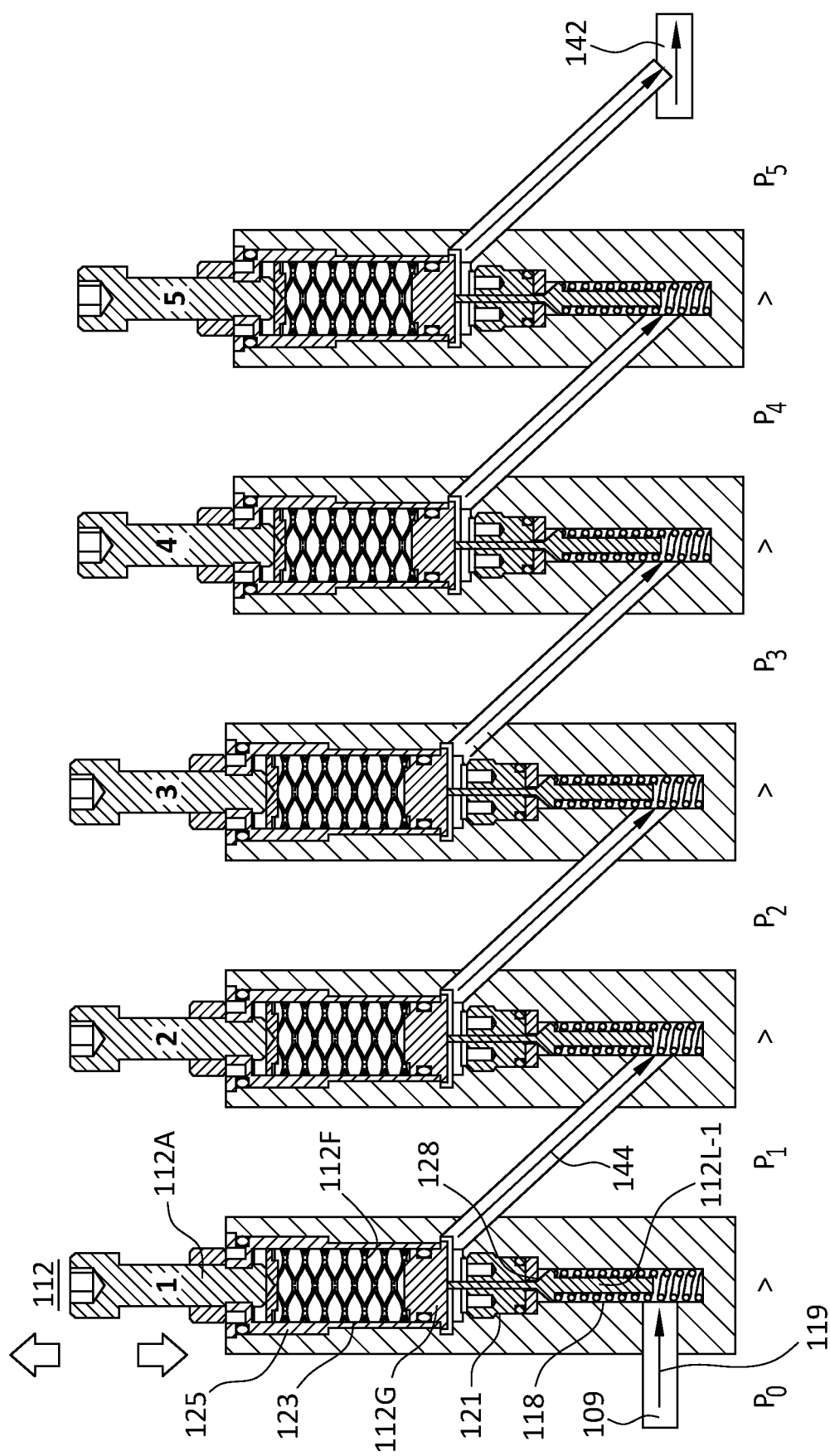
FIG. 2A illustrates a flow path within different stages of the pressure regulating device in accordance with an embodiment of the invention.
Figure 2B:
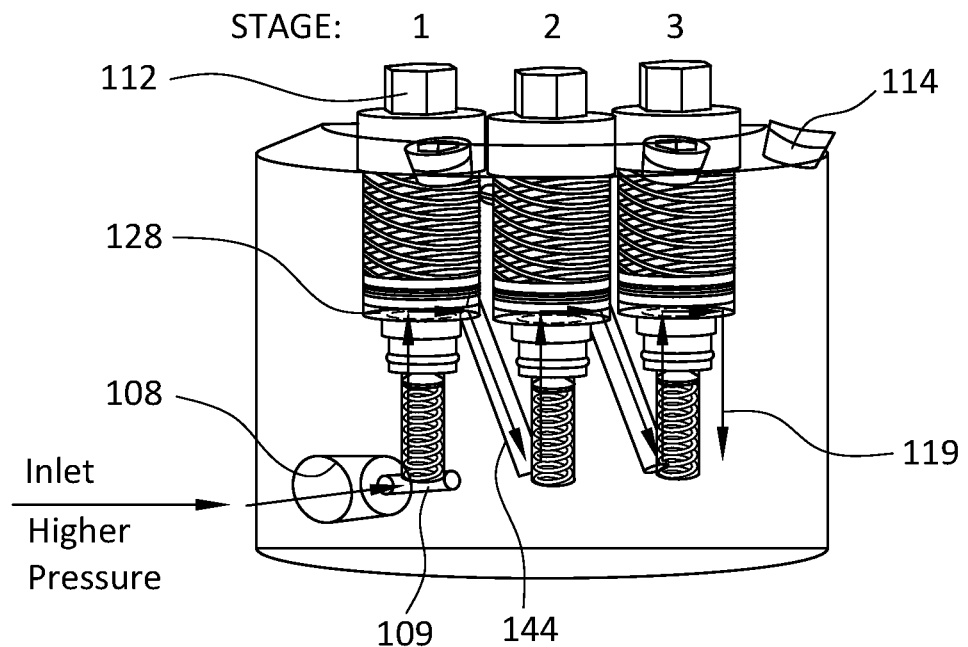
FIG. 2B illustrates a flow path within different stages of the pressure regulating device in accordance with an embodiment of the invention.
Figure 2C:
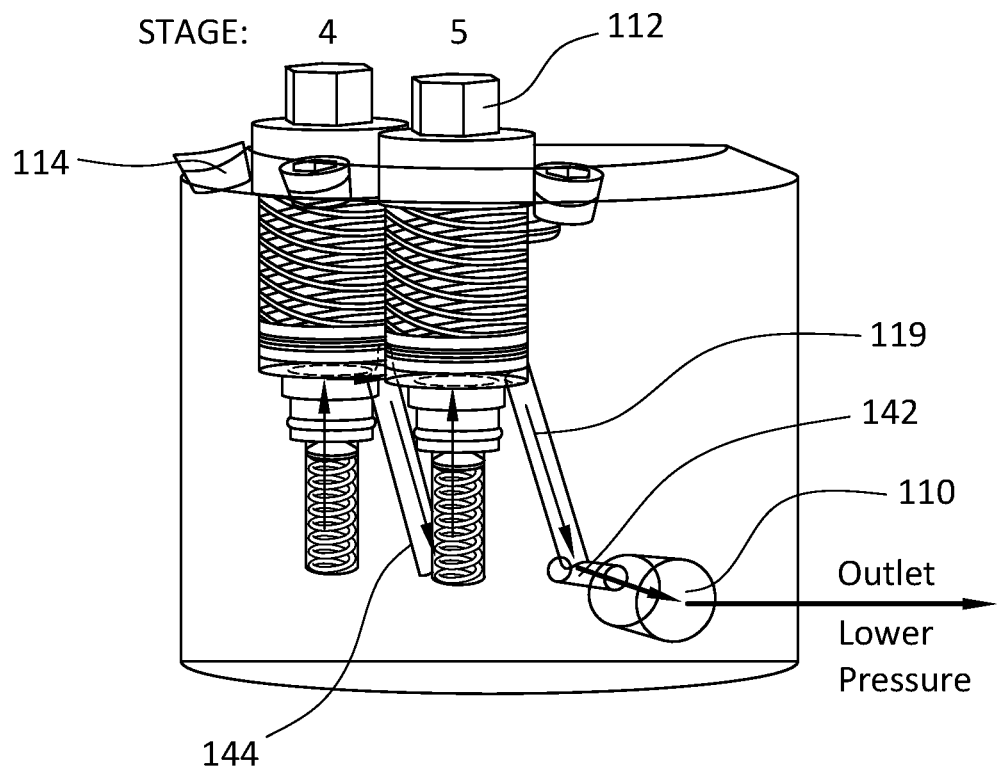
FIG. 2C illustrates a flow path within different stages of the pressure regulating device in accordance with an embodiment of the invention.

FIGS. 2A-2C illustrate the flow of the vapor sample 119 as it flows from the vapor sample passageway 109 downstream through five stages to the vapor sample outlet port 110 via the plurality of pressure regulating valves 112 and corresponding interconnect channels 144. In this example, it is assumed that the pressure regulating valves 112 have been properly calibrated and have had appropriate pressure settings applied via the adjustment device 112A such that the incoming vapor sample 119 will have enough pressure at each pressure regulating valve 112 to force each pressure regulating valve 112 into the regulating position. The adjustment device 112A is configured to move axially within the opening 146 via a threaded spring housing 112C and termination nut 112B such that it displaces a washer 112E abutting the sense piston spring 112F (See FIG. 4). Alternatively, as illustrated in FIGS. 1E and 3, adjustment devices 112A, such as screws or bolts, can be configured to directly abut the upper planar surface 106 of the tubular upper body 102 and be threaded therethrough into the pressure regulating valves 112 to adjust pressure settings. In this example, the adjustment devices 112A require less space thereby reducing the overall profile of the pressure regulating device 100. However, unlike the adjustment device 112A configuration illustrated in FIGS. 1A, 1B, 2 and 3, this requires additional threading within the bore 125 of the pressure regulating valves which can increase manufacturing cost.

To adjust the pressure of a particular stage of the pressure regulating device 100, the adjustment device 112A can be rotated through the threaded spring housing 112C to either compress or decompress the sense piston spring 112F via washer 112E thereby and calibrate by increasing or decreasing the pressure of the sense piston spring 112F on the abutting sense piston 112G. The higher the pressure setting at a particular stage translates to a higher sense piston spring 112F pressure which forces the sense piston 112G to displace the conical valve stem projection 112-L2 to a less restrictive position approximate valve seat 112J via the valve stem tip 112L-3. Accordingly, in FIGS. 2A and 2B, the pressure setting of the pressure regulating valve 112 at Stage 1 will be greater than the pressure setting of the pressure regulating valve 112 at Stage 2 and so forth with the pressure setting of the pressure regulating valve 112 at Stage 5 being the lowest.

Referring to FIGS. 1D and 1E, the pressure setting at each stage can be set and verified via respective access channels 115 each connected to a corresponding interconnect channel 144 at the output of a corresponding pressure regulating valve 112. For example, to calibrate the pressure setting of the pressure regulating valve 112 at Stage 5, the pressure within the interconnect channel 144 output from the pressure regulating valve 112 of Stage 5 towards passageway 142 is measured via corresponding access channel 115. FIG. 1E illustrates an access channel 115 connected to the interconnect channel 144 of the pressure regulating valve 112 at Stage 1. The access channel 115 is illustrated as being plugged by the access channel hole plug 114, such as a crown cap or screw cap. However, to calibrate the pressure and/or temperature at Stage 1, the access channel hole plug 114 is removed and either or both of a pressure sensor and a thermal sensing device can be installed in access port 114 to provide serve as additional input to the controller. Accordingly, when the vapor sample 119 is being passed through the pressure regulating device 100, the pressure and/or temperature sensor will detect the pressure/temperature of the vapor sample 119 exiting the pressure regulating valve 112 at Stage 1 in the interconnect channel 144 via access channel 115. The pressure regulating valve 112 can then be adjusted via adjustment device 112A until the pressure sensor detects a desired pressure reduction reading from the vapor sample 119 input into the vapor sample input port 108. This process can then be repeated for each successive pressure regulating valve 112 at each stage using a pressure sensor at a corresponding access channel 115. Correspondingly, the thermal heater can be adjusted to raise or lower the vapor sample temperature as called for and manipulated by the controller.

Another method for calibrating the pressure regulating device 100 is to measure the pressure at each access channel 115 at the same time and simultaneously adjust the pressure regulating valve 112 at each stage. The pressure settings can be adjusted based on a specific application or particular gas profile. Of course, when calibration is not being performed or when calibration is completed, the access channel hole plugs 114 will be replaced to plug the access channels 115, unless it is desired to maintain automated pressure sensors continuously.

The ability to individually adjust the pressure setting of pressure regulating valves 112 at different stages provides for a pressure regulating device 100 that can be used for a variety of gases having different profiles. Therefore, based on the thermodynamic properties and phase curve of a particular vapor gas profile being processed by the pressure regulating device 100, each pressure regulating valve 112 can be calibrated to reduce pressure at each stage at reduction levels that do not allow for reversion or reentry of the vapor gas sample into the two-phase region of the phase curve. The reduction at each stage can be further controlled by the assembly 116 and, more particularly, the heating cartridge element 138, substantially centrally located within the radially surrounding pressure regulating valves 112 which consistently maintains the temperature of the vapor sample 119 during all depressurizing stages required to prevent dew point condensation/hydrocarbon dew point dropout. Accordingly, the pressure regulating device 100 can be dynamically calibrated over time for various applications and/or gas profiles rather than requiring a different pressure regulating device for each application or gas profile. Further, the pressure regulating device 100 does not require a specifically high minimum amount of initial pressure entering the first stage as the other stages can be dynamically set lower to offset any initially low pressure entering the pressure regulating device 100.

Referring again to FIGS. 2A and 2B and as one example, once the pressure regulating valves 112 are properly calibrated using corresponding adjustment devices 112A and access channels 115, the vapor sample 119 input into the lower bore 118 via passageway 109 at connector port 113A will have a pressure Po greater than the pressure setting at Stage 1 which will cause the valve stem tip 112L-3 to shift axially upward to displace the sense piston 112G. This displacement causes the conical valve stem projection 112L-2 to displace axially upwards within the valve seat 112J thereby restricting the flow of the vapor sample 119 directed through channel 127 within middle bore 121 and upper bore 123 to a reduced pressure Pi which is subsequently directed to Stage 2 via interconnect channel 144.

The vapor sample 119 having reduced pressure Pi then enters the lower bore 118 of pressure regulating valve 112 at Stage 2 which has a pressure setting lower than Pi such that the vapor sample 119 can again pass through the pressure regulating valve 112 to the next stage. This process repeats until the vapor sample 119 having a reduced pressure $P_S$ exits the pressure regulating valve 112 at Stage 5 via outlet sample port 110 to be passed to external equipment such as an analyzer. As the vapor sample 119 is flowing through each stage at respective radially disposed pressure regulating valves 112, the vapor sample 119 is can be optimally thermally controlled via the heating element 138 disposed substantially centrally within the stem 116B of the assembly 116. Accordingly, the pressure of the vapor sample 119 is subject to thermal control as well as a controlled pressure reduction at each stage to avoid dew point dropout into a two-phase sample during the depressurization sequence. When the well integrates pressure and temperature sensing between each stage, the vapor is maintained as a condition outside the phase curve to avoid jeopardizing the sample by creating a two phase separation condition. The controlled environment provided by the specifically calibrated pressure regulating valves 112 and the substantially centrally located heating element 138 maintain the vapor sample 119 in the vapor phase region thereby eliminating the risk of condensation or dew point dropout which could taint analysis of the sample and/or damage or destroy a downstream the analyzer.

Figure 6:
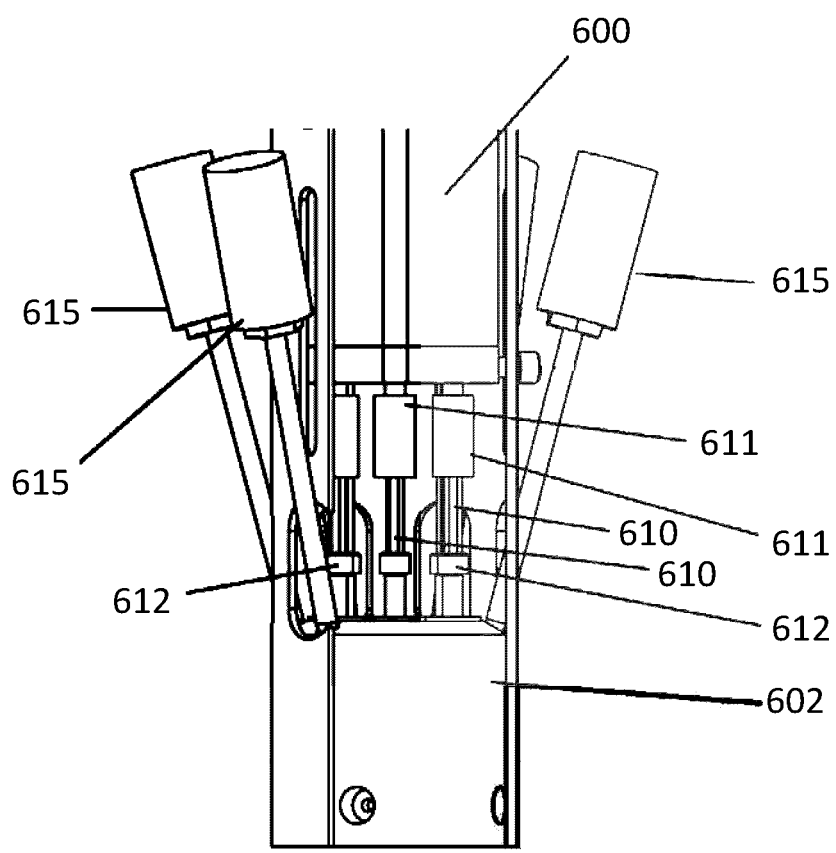
FIG. 6 illustrates an embodiment with an automatic calibration tool.

As illustrated in FIG. 6, it is further contemplated herein that the pressure regulating device 602 could be automatically calibrated with a multi-faceted calibration tool 600 either manually or with a motor 611 which is mechanically connected to the adjustment devices 612 by a shaft 610 and electrically connected to or including a pressure sensor(s) 615. Such a calibration tool 600 could compute pressures detected via the pressure sensor(s) 615 and use the motor 611 to automatically adjust one or more adjustment devices 612 in real-time accordingly to provide an optimal calibration setting of each stage. Alternatively, the pressure regulating device 602 could include a motor connected to the adjustment devices 612 which could be accessed locally or remotely to adjust the pressure settings at each stage based on readings processed from one or more pressure sensors 615 connected to one or more access channels 115.

FIGS. 3A and 3B illustrate an interior view of the assembled pressure regulating device 100 in accordance with an embodiment of the invention. As illustrated, the pressure regulating device 100 includes the plurality of access channels 115 connected to interconnect channels 144 thereby providing the ability to measure pressure and calibrate the various stages. Also illustrated is the substantially central location of the heating cartridge element 138 (disposed in the assembly stem 116B) within the radially disposed pressure regulating valves 112. A vapor gas sample enters the pressure regulating device via vapor sample input port 108 and is directed to the pressure regulating valve 112 of Stage 1 via passageway 109. Assuming the pressure regulating device is properly calibrated, the vapor sample will be directed in series through each pressure regulating valve 112 causing a pressure reduction at each stage such that the vapor sample exiting the pressure regulating valve 112 of Stage 5 via outlet 110 will have a pressure suitable for analysis by pressure-sensitive equipment such as a chromatograph.

Figure 4:
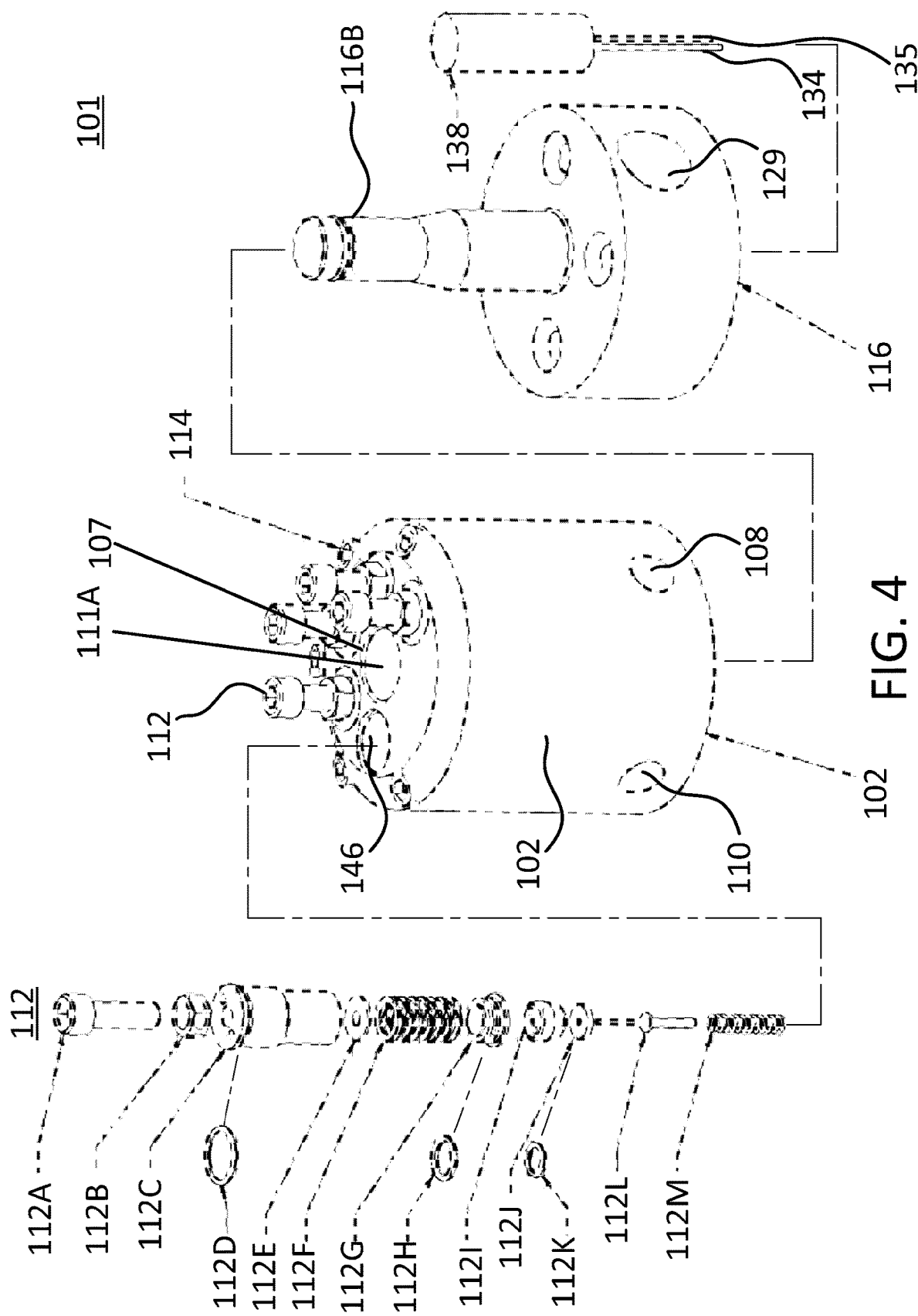
FIG. 4 is an exploded view of a pressure regulating system and components in accordance with an embodiment of the invention.

FIG. 4 illustrates an exploded view of an exemplary pressure regulating system 101 which when assembled forms the pressure regulating device 100. The pressure regulating system 101 includes one or more pressure regulating valves 112, the tubular upper body 102, assembly 116 and heating element 138. One or more of the pressure regulating valves 112 include the adjustment device 112A threaded through the termination nut 112B, spring housing 112C and housing seal 112D to contact washer 112E which can increase or decreases the force exerted by sense piston spring 112F against sense piston 112G. The valve stem 112L, enclosed within valve stem spring 112M, provides an opposing force towards the sense piston seat 112G via movement through a valve seat 112J and valve guide 112I sealed via a guide seal 112K. The one or more pressure regulating valves 112 are fitted within the one or more openings 146 which extend axially within the tubular upper body 102 to provide a step-bored well within an interior of the tubular upper body 102.

In one example, the segment 111B is formed within the tubular upper body 102 by boring from the bottom portion of the body 102 near the radially bored vapor sample input 108 and output ports 110 (See FIG. 1B). The segment 111B is formed to be tapered roughly at its midpoint along an axial length of the segment 111B. The opening 107 can be separately drilled from the upper planar surface 106 of the tubular upper body 102 to form and connect the segment 111A with the bored segment 111B. The opening 107 in this example is formed from the upper planar surface 106 because the diameter of the segment 111A is larger than the diameter of the segment 111B formed directly below the opening 107. It is at this point at which the segment 111A meets the segment 111B that an assembly seal is used to seal the assembly 116 within the tubular upper body 102 when inserted therein. This ensures maximum heat transfer by maintaining the heating cartridge element 138 within the central interior of the tubular upper body 102 and by maintaining stem 116B against the taper formed by segment 111B.

The assembly 116 includes the inner cavity 136 bored within the assembly stem 116B from the base 116A of the assembly 116 to provide for insertion of the heating cartridge element 138 therein. The cavity may be cylindrical or tapered to increase the contact area and enhance thermal energy transfer into body 102. The electrical feed lines 134 and thermocouple 135 can be inserted via control output port 129 radially bored into the assembly 116 and connected to the heating cartridge element 138 via the inner cavity 136. The thermocouple 135 can be connected to a proportional-integral-derivative (PID) controller and/or Programmable Logic Controller (PLC) (not shown), such as an Allen Bradley 850 series PLC or equivalent controller, to provide signal feedback and control of the pressure regulating device 100. Once the heating cartridge element 138, electrical feed lines 134 and thermocouple 135 are enclosed within the assembly 116, the opening bored into the base 116A of the assembly 116 is closed with an internally threaded plug to provide a closed system. For safety, the plug can be explosion-proof in accordance with one or more applicable standards, such as the ATEX standard.

The assembled pressure regulating device 100 provides for a compact design that is less costly to manufacture and enables use of the pressure regulating device 100 in smaller areas within sample conditioning equipment. As discussed herein, the pressure regulating device 100 can be used for a variety of different applications as it can be dynamically adjusted based on a specific application or profile of gas to be measured. Further, the radially located pressure regulation valves 112 connected in series avoid issues created by gravity commonly associated with vertically designed multistage regulators.

Figure 5A:
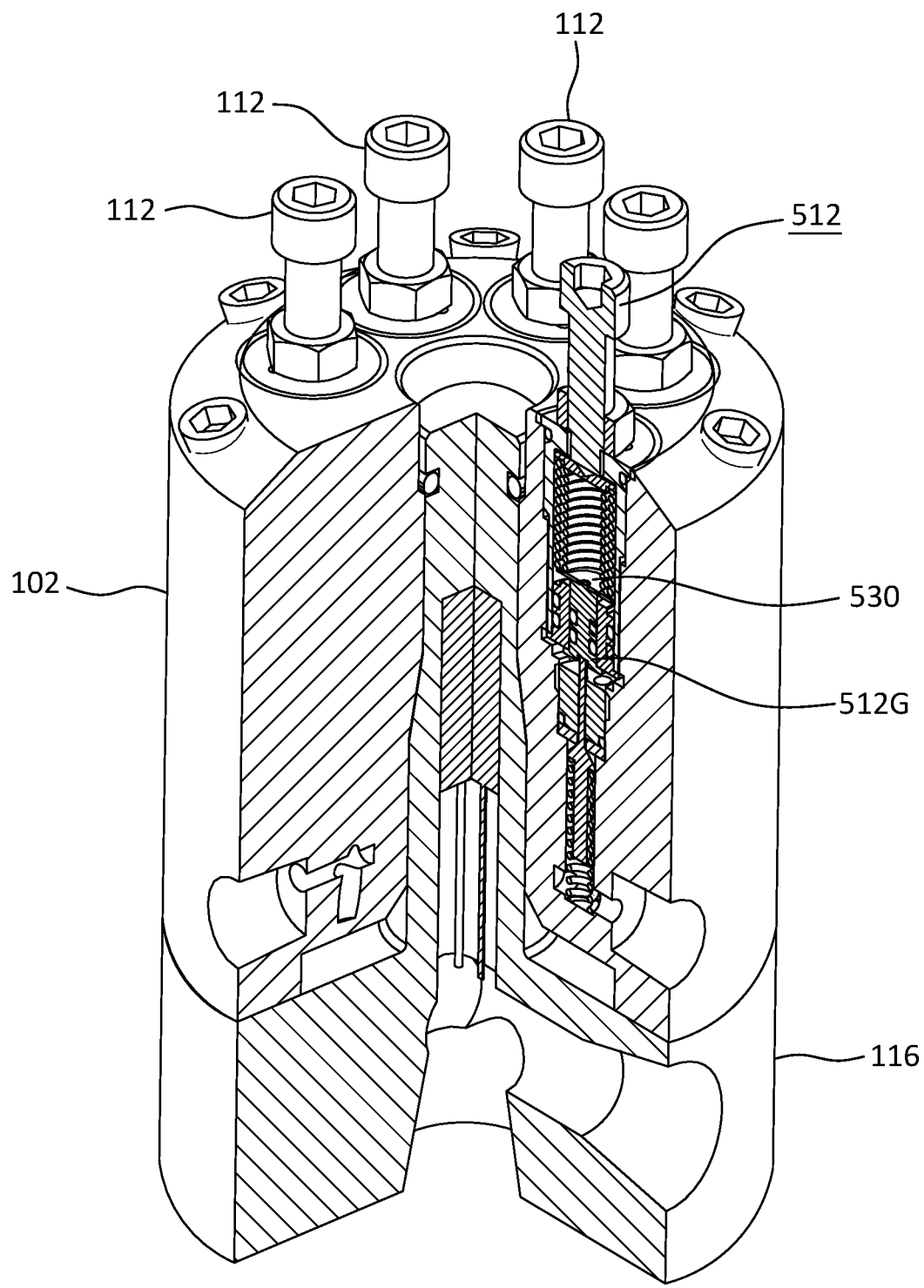
FIG. 5A is a cross-sectional view of an embodiment of the invention providing for regulating high-pressure.

FIG. 5A depicts an alternative embodiment for the regulating valve assembly. This embodiment provides for a greater degree of depressurizing the incoming vapor sample for samples at higher starting pressures for example, upwards from 41300 kPa (6000 psi) to 69000 kPa (10.000 psi). The high pressure regulator embodiment includes a regulator housing 102 and a base 116 that remain essentially unchanged from the above-described embodiments. The third through fifth regulating valves 112, likewise remain unchanged from the foregoing. However, at least the first and, preferably, the second pressure regulating valve assemblies 512 differ. The high-pressure embodiment features a nested bifurcated sense piston 530 and at least one heavier sense piston actuator spring.

One embodiment of a high-pressure valve assembly is depicted in FIG. 5B. The high pressure valve embodiment, as illustrated, dimensionally conforms to the valve assemblies 112 but incorporates a two-component sense piston 512G structure essentially establishing an inner core cylinder element 512Gi slidably nested in an outer shell cylinder 512Go to allow for relative axial movement between the two. The cylinder elements 512 Gi and 512Go may include one or more sealing rings 532 disposed about their exterior surface to prevent vapor leakage. The high pressure depressurizing arrangement also eliminates the washer 112E disposed below the sense piston depicted in FIG. 4. Eliminating the washer 112 enables use of a heavier downwardly biased sense piston actuator spring or, preferably, as depicted in FIG. 5B, a dual spring arrangement. The dual spring construct includes an inner spring 512Fi nested within an outer spring 512Fo which are both seated in the spring housing 512C. Disposed below, at least the inner spring is washer 530 that has a diameter less than the inner diameter of the spring housing 512C. In one embodiment, the inner spring 512Fi impinges directly on a disc-like washer 530 resulting in effectively enlarging the diameter of the inner center core cylinder 512Gi to concentrate the downward spring force from the inner spring 512Fi. This force translates through the inner core cylinder 512Gi and is transmitted to the valve stem tip 512L-3. The outer spring 512Fo may impinge directly against the top surface of the outer shell cylinder 512Go of the sense piston 512G.

In another embodiment, the diameter of the washer 530 extends substantially across the entire inner diameter of the spring housing 512C resulting in direct contact with both the inner spring 512Fi and the outer spring 512Fo. Where the diameter of the washer 530 corresponds to the outer diameter of the outer spring 512Fo, maximum spring force is applied to the sense piston by both springs. Using a smaller diameter washer reduces spring force pressure applied to the to the washer due to the lessened contact with the springs. This feature permits a greater degree of design flexibility for achieving a desired depressurizing regulation.

In other words, this arrangement directs the entire compressive spring force of the springs 512Fi and 512Fo to the smaller diameter inner core 512Gi through the washer 530 which enhances its effective compression and the downwardly directed force on the upwardly projecting stem valve 512L-3 where it contacts and presses against the inner core piston cylinder 512Gi of the sense piston thereby providing effective pressure regulation at higher starting pressures.

Structurally, the washer 530 is formed from stainless steel or an alternative rigid strong material, e.g., ceramic, non-reactive metal alloy, etc. and, preferably, includes a receiving notch centered in central opening 532 dimensioned to receive and co-act with a protrusion 534 projecting above the generally planar upper surface of the inner core piston cylinder 512Gi to positionally stabilize the washer 530 in the spring housing 512C.

As noted, standardization of the housing bore sizes is achieved when the high-pressure valve assembly dimensions correspond to the earlier-described valve assembly embodiments. However, where circumstances require, the bore sizes of the first two valve receiving recessed openings may be enlarged to accommodate larger-sized high-pressure regulating valve assemblies when necessary to achieve the required degree of enhanced pressure regulation.

FIGS. 7 through 10 depict enhanced thermal regulating control adjuncts employable in foregoing adjustable multistage heated regulator invention. The enhanced control is provided by a combination of a heater cartridge 138 with a temperature sensor 139 which may be a thermocouple, resistance temperature detector, or equivalent disposed at the upper tip thereof and thermal distribution insert adjunct to promote heat distribution from the axially disposed heater cartridge toward the periphery of the regulator body.

Figure 7:
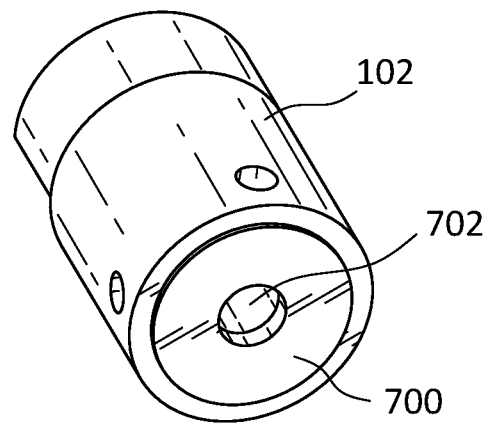
FIG. 7 is a perspective assembly view of an embodiment of a thermal distribution washer insert of the invention
Figure 8:
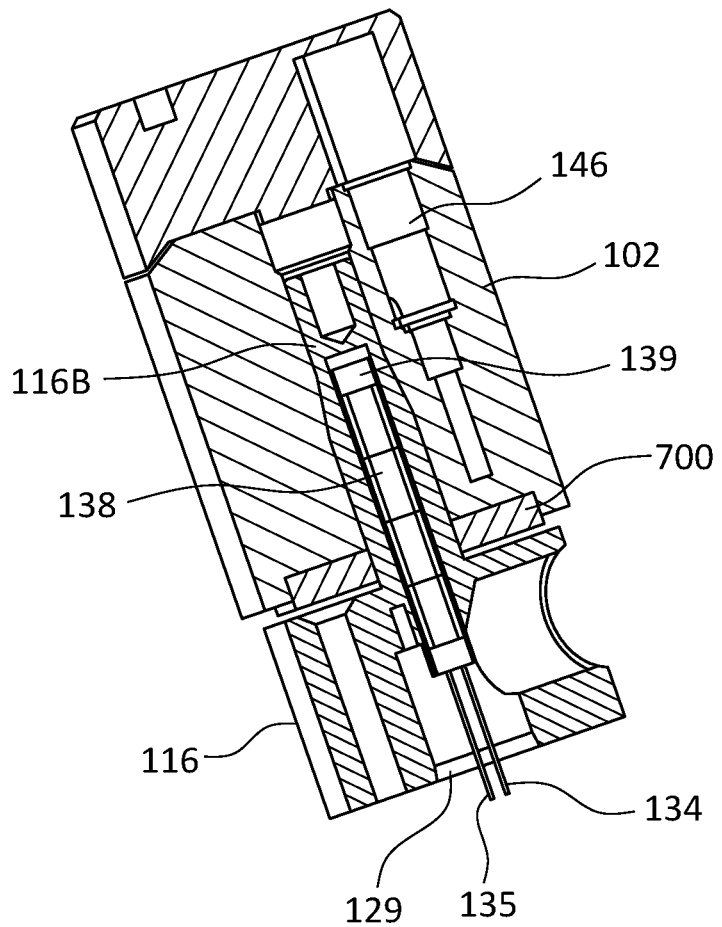
FIG. 8 is cutaway perspective assembly view of the FIG. 7 embodiment disposed in the heated regulator device.

The basic embodiment of the distribution insert adjunct is illustrated in FIGS. 7 and 8 and includes a brass washer 700 disposed in a tight abutting relation recessed into the bottom of the regulator upper body 102 above the base 116. The brass washer 700 includes a central hole 702 dimensioned to register with the base projection 116B. The diameter of the hole 702 is sized to fit snuggly on the projection 116B and maximize efficient and uniform heat energy transfer from the heater cartridge 138 to the regulator upper body 102. This enhancement minimized undesirable temperature variations across the regulator upper body 102 with the concomitant risk of phase curve violations at the various regulator stages.

Figure 9:
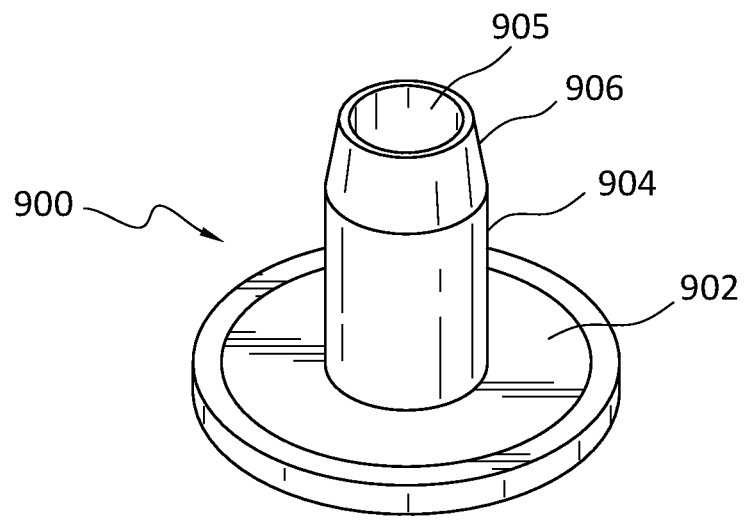
FIG. 9 is a perspective view of a thermal distribution sleeve bayonet ferrule insert in accordance with an embodiment of the invention.
Figure 10:
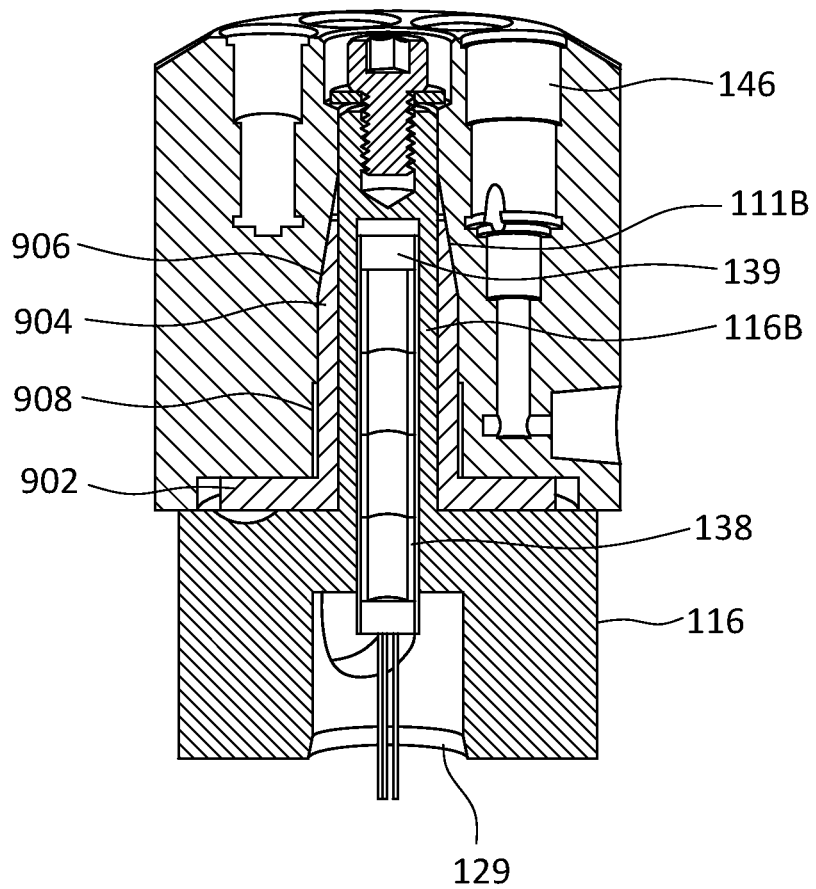
FIG. 10 is cutaway perspective assembly view of the FIG. 9 embodiment disposed in the heated regulator device.

A more sophisticated thermal distribution insert construct is illustrated in FIGS. 9 and 10. This embodiment features a tapered cylindrical sleeve ferrule type fitting 900. The ferrule-type fitting 900, preferably composed of highly heat-conductive metal such as copper or brass, incorporates a washer-like, flanged base 902 sized to be received in a corresponding annular recess disposed at the base of tapered bore 111 of the regulator upper body 102 to nest therein above the base 116. Projecting from the surface of the base 902 is a cylindrical bayonet sleeve element 904 that includes a tapering perimetric upper surface 906 dimensioned for slidable, wiping engagement with the tapered bore section 111B. Likewise, the bore 905 of the cylinder sleeve dimensionally corresponds to the radius of the projection 116B to register therewith in tight abutment. The fitting 900, accordingly enhances selective heat energy transfer by the core to the periphery of the regulator body 102. While described above as being composed of metal, e.g., brass or copper, the invention contemplates a thermal distribution insert adjunct composed of any chemically-inert, efficient heat-transfer material capable of withstanding formation of discontinuities attributable to corrosion or oxidation from use.

The embodiment depicted in FIG. 10 also allows for potential customization of the heat transfer functionality based on specific requirements. An annular gap 908 of a select length is cut out from of the base of the bore 111 above the recess for flanged base fitting 902 at the more remote section of the bayonet sleeve from the heater cartridge temperature sensor 139. Alternatively, a gap may be formed by a recessed annulus on the perimetric lower surface of the bayonet sleeve 904. The presence of the gap provides the user to customize the efficiency of heat energy transfer by focusing the transfer along the upper perimetric sleeve surface toward the taper 906 which corresponds to the region of the regulator with the valves where Joule Thomson cooling effects may arise during depressurization. In other words, in selected applications it may be desirable to focus heat energy where it is most needed by biasing the temperature range to the positive and minimizing of creating low temperature zones proximate to the valves. By so manipulating heat energy to the positive (high temperature), inaccuracies can be avoided from lower detected temperature sensed at the section most axially remote from the integrated temperature sensor. When the temperature sensor detects a temperature decline, electrical current is increased to the heater cartridge to generates additional heat energy for transfer from the upper bayonet sleeve section 904 into the upper regulator body 102.

In addition to the above noted enhanced thermal control provided by distribution of heat energy from the heater cartridge the present invention also optimizes access to the multistage regulator components to reduce labor and costs associated with the repairability and or maintenance thereof. Removal and replacement of discrete components may be accomplished without disturbing the other components which may otherwise compromise the integrity of the heated multistage regulator.

It would be understood for a person having ordinary skill in the art that a device or method incorporating any of the additional or alternative details mentioned above would fall within the scope of the present invention as determined based upon the claims below and any equivalents thereof. For example, although five access channels 115, five openings 146 and five corresponding pressure regulating valves 112 are illustrated, it is contemplated herein that fewer or more of these features could be implemented to provide different configurations as would be understood by one of ordinary skill in the art. Further, in an exemplary implementation discussed herein, the vapor gas sample is received from the output of a vaporizer device which has vaporized a liquid sample into vapor form. However, the pressure regulating device 100 can be used to regulate a vapor gas sample received directly from natural gas or from other types of equipment at other points upstream or downstream within a gas sample conditioning system.

Other aspects, objects and advantages of the present invention can be obtained from a study of the drawings, the disclosure and the appended claims.

We claim:

1. A pressure regulating system, for stepped depressurization of a vapor sample, comprising: a) a housing, said housing including an elongated upper section and a lower section, said lower section including a base with a stem generally disposed orthogonal to and extending axially from the base and defining an exterior surface, the stem being formed so as to generally conform to the dimensions of the core and extending axially from a central portion of the base; b) a core of select length disposed generally longitudinally along a central axis of the upper section of the housing and defining an interior surface with an upper segment and a lower segment; c) a vapor sample input port connected to a vapor sample passage integrally formed within the upper section of the housing; d) a plurality of unvented openings on an upper surface of the upper section of the housing, each unvented opening being peripherally disposed about the core and adjacent to at least one other of said unvented openings, each of the unvented openings having a select cross-sectional dimension and extending substantially in the direction of elongation of the upper section of the housing, and each of said unvented openings being connected by an interconnect channel integrally formed in said upper section of the housing and connected to an adjacent ventless opening; e) a plurality of pressure regulating valves each of said plurality of pressure regulating valves having a cross-sectional dimension corresponding to the select cross-sectional dimension of an unvented opening, each of said plurality of pressure regulating valves being switchable between a non-pressure regulating mode and a pressure regulating mode for passing a vapor sample to an adjacent downstream pressure regulating valve at a select regulated pressure via the connected interconnect channel where each of said plurality of pressure regulating valves establishes a pressure reducing stage and includes a valve stem, a sense piston, and sense piston actuator; a most downstream regulating valve connected in series to said plurality of pressure regulating valves; f) a reduced vapor sample output port connected to said most downstream pressure regulating valve; g) a heating device disposed within the stem configured to heat vapor sample passing through the plurality of pressure regulating valves; and h) means for distribution of thermal energy from the heating device to the plurality of pressure regulating valves.

2. The pressure regulating system of claim 1 where the means for enhanced distribution of thermal energy comprises a brass washer disposed above and abutting said housing base.

3. The pressure regulating system of claim 2 where the means for enhanced distribution of thermal energy further comprises a recess of select depth formed in the housing about said core and where the brass washer has a thickness corresponding to the select depth to nest in the recess.

4. The pressure regulating system of claim 1 where the means for enhanced distribution of thermal energy comprises a sleeve fitting with a radially extending flanged base and a cylindrical bayonet sleeve having a bottom section and a top section axially extending within the core dimensioned to seat between the interior surface of the core and the exterior surface of the stem.

5. The pressure regulating system of claim 4 where the means for enhanced distribution of thermal energy further comprises a recess of select depth formed in the housing about said core and where the radially extending flanged base has a thickness corresponding to the select depth to nest in the recess.

6. The pressure regulating system of claim 5 where said heating device is elongated with a lower end disposed in the base and an upper end disposed in the upper segment of the core and the upper end includes a temperature sensor.

7. The pressure regulating system of claim 6 where the sleeve fitting has a height less that the select length of the core and the top section tapers radially inwardly where the sleeve fitting overlies the temperature sensor in the upper end of the heating device.

8. The pressure regulating system of claim 7 where the lower segment of the core defines an annular gap.

9. The pressure regulating system of claim 6 where the sleeve fitting adapted to underly the lower segment of the core defines an annulus of select length and thickness to establish a gap between the interior surface of the core and the exterior surface of the sleeve.

10. A pressure regulating system, for stepped depressurization of a vapor sample, comprising:
   a housing with an upper portion where the upper portion includes a cylindrical core disposed generally longitudinally along a central axis of the upper portion of the housing and a lower portion where the upper portion of the housing includes an annular recess of a select radius and select depth and the lower portion of the housing includes an assembly having a base and stem generally disposed orthogonal to the base and extending axially therefrom, the base underlying the annular recess of the upper housing portion and the stem being formed so as to generally conform to the dimensions of the core and extending axially from a central portion of the base where the stem includes a longitudinal receiving bore of select length with an upper end and a lower end and cross-sectional dimensions formed therein;
   a vapor sample input port connected to a vapor sample passage integrally formed within the housing;
   a plurality of unvented openings on an upper surface of the housing, each unvented opening being peripherally disposed about the core and adjacent to at least one other of said unvented openings, each of the unvented openings having a select cross-sectional dimension and extending substantially in the direction of elongation of the housing, and each of said unvented openings being connected by an interconnect channel integrally formed in said housing and connected to an adjacent ventless opening;
   a plurality of pressure regulating valves each of said plurality of pressure regulating valves having a cross-sectional dimension corresponding to the select cross-sectional dimension of an unvented opening, each of said plurality of pressure regulating valves being switchable between a non-pressure regulating mode and a pressure regulating mode for passing a vapor sample to an adjacent downstream pressure regulating valve at a select regulated pressure via the connected interconnect channel where each of said plurality of pressure regulating valves establishes a pressure reducing stage and includes a valve stem, a sense piston, and sense piston actuator;
   a most downstream regulating valve connected in series to said plurality of pressure regulating valves;
   a reduced vapor sample output port connected to said most downstream pressure regulating valve;
   a heating device disposed within the stem with an upper end and a lower end where the upper end includes a temperature sensor and where heating device is configured to heat vapor sample passing through the plurality of pressure regulating valves; and
   a sleeve fitting with a radially extending flanged base and a cylindrical bayonet sleeve having a bottom section and a top section axially extending within the cylindrical core dimensioned to seat between the interior surface of the core and the exterior surface of the stem.

11. The pressure regulating system of claim 10 where the sleeve fitting has a height less that the select length of the core and the top section tapers radially inwardly where the sleeve fitting overlies said temperature sensor in the upper end of the heating device.

12. The pressure regulating system of claim 11 where the temperature sensor is a Resistance Temperature Detector.

13. The pressure regulating system of claim 10 where the core defines an annula disposed proximate to the base.

14. The pressure regulating system of claim 10 where the sleeve incorporates an annular ring of select height disposed above the base.

* * * * *